US009774035B2

(12) United States Patent
Barker et al.

(10) Patent No.: US 9,774,035 B2
(45) Date of Patent: Sep. 26, 2017

(54) DOPED NICKELATE COMPOUNDS

(71) Applicant: FARADION LIMITED, Sheffield (GB)

(72) Inventors: Jeremy Barker, Chipping Norton (GB); Richard Heap, Oxford (GB)

(73) Assignee: FARADION LIMITED, Sheffield (GB)

( * ) Notice: Subject to any disclaimer, the term of this patent is extended or adjusted under 35 U.S.C. 154(b) by 31 days.

(21) Appl. No.: 14/413,824

(22) PCT Filed: Jul. 10, 2013

(86) PCT No.: PCT/GB2013/051821
§ 371 (c)(1),
(2) Date: Jan. 9, 2015

(87) PCT Pub. No.: WO2014/009722
PCT Pub. Date: Jan. 16, 2014

(65) Prior Publication Data
US 2015/0194672 A1    Jul. 9, 2015

(30) Foreign Application Priority Data

Jul. 10, 2012 (GB) .................................. 1212261.0

(51) Int. Cl.
| | |
|---|---|
| *H01M 4/525* | (2010.01) |
| *H01M 4/505* | (2010.01) |
| *H01M 10/054* | (2010.01) |
| *C01G 53/00* | (2006.01) |
| *H01M 10/0525* | (2010.01) |

(52) U.S. Cl.
CPC ............ *H01M 4/525* (2013.01); *C01G 53/42* (2013.01); *C01G 53/50* (2013.01); *C01G 53/66* (2013.01); *H01M 4/505* (2013.01); *H01M 10/054* (2013.01); *H01M 10/0525* (2013.01); *C01P 2002/50* (2013.01); *C01P 2002/72* (2013.01); *C01P 2006/40* (2013.01)

(58) Field of Classification Search
CPC ........ C01G 53/42; C01G 53/50; C01G 53/66; C01P 2002/50; C01P 2002/72; C01P 2006/40; H01M 10/0525; H01M 10/054; H01M 4/505; H01M 4/525
See application file for complete search history.

(56) References Cited

U.S. PATENT DOCUMENTS

| | | | |
|---|---|---|---|
| 4,246,253 | A | 1/1981 | Hunter |
| 5,135,732 | A | 8/1992 | Barboux et al. |
| 6,203,946 | B1 | 3/2001 | Barker et al. |
| 6,387,568 | B1 | 5/2002 | Barker et al. |
| 2002/0142225 | A1 | 10/2002 | Kweon et al. |
| 2002/0192148 | A1 | 12/2002 | Kweon et al. |
| 2003/0003361 | A1 | 1/2003 | Sunagawa et al. |
| 2003/0180616 | A1 | 9/2003 | Johnson et al. |
| 2005/0008563 | A1 | 1/2005 | Naruoka |
| 2005/0130042 | A1 | 6/2005 | Liu et al. |
| 2005/0202316 | A1 | 9/2005 | Hwang et al. |
| 2006/0194114 | A1 | 8/2006 | Saito |
| 2007/0218361 | A1 | 9/2007 | Ilnoue et al. |
| 2007/0224506 | A1 | 9/2007 | Ooyama et al. |
| 2009/0087740 | A1 | 4/2009 | Deguchi et al. |
| 2009/0159838 | A1 | 6/2009 | Okada et al. |
| 2009/0290287 | A1 | 11/2009 | Lipka et al. |
| 2010/0173202 | A1 | 7/2010 | Saito et al. |

(Continued)

FOREIGN PATENT DOCUMENTS

| | | |
|---|---|---|
| CN | 1389941 A | 1/2003 |
| CN | 1225045 C | 10/2005 |

(Continued)

OTHER PUBLICATIONS

Search Report issued by the State Intellectual Property Office of the People's Republic of China, in connection with Chinese Patent Application No. 2013800363719, dated Sep. 22, 2015.
Search Report issued by the State Intellectual Property Office of the People's Republic of China, in connection with Chinese Patent Application No. 2013800363390, dated Sep. 14, 2015.
Search Report issued by the State Intellectual Property Office of the People's Republic of China, in connection with Chinese Patent Application No. 2013800363653, dated Aug. 25, 2015.
Search Report issued in connection with Chinese Patent Application No. 201380036360.0, dated Aug. 5, 2015.
First Office Action issued in connection with Chinese Patent Application No. 201380036360.0, dated Aug. 20, 2015.
Antolini, Ermete, "The Stability of Molten Carbonate Fuel Cell Electrodes: A Review of Recent Improvements," Applied Energy, 2011, vol. 88, pp. 4274-4293.
Great Britain Intellectual Property Office Search Report for Great Britain Patent Application No. GB1218047.7, dated Feb. 19, 2013.
Great Britain Intellectual Property Office Further Search Report for Great Britain Patent Application No. GB1218047.7, dated Nov. 11, 2013.

(Continued)

*Primary Examiner* — Carlos Barcena
(74) *Attorney, Agent, or Firm* — Meunier Carlin & Curfman LLC

(57) ABSTRACT

The invention relates to novel materials of the formula: $A_{1-\delta}M^1{}_V M^2{}_W M^3{}_X M^4{}_Y M^5{}_Z O_2$ wherein A is one or more alkali metals comprising sodium and/or potassium either alone or in a mixture with lithium as a minor constituent; $M^1$ is nickel in oxidation state +2; $M^2$ comprises a metal in oxidation state +4 selected from one or more of manganese, titanium and zirconium; $M^3$ comprises a metal in oxidation state +2, selected from one or more of magnesium, calcium, copper, zinc and cobalt; $M^4$ comprises a metal in oxidation state +4, selected from one or more of titanium, manganese and zirconium; $M^5$ comprises a metal in oxidation state +3, selected from one or more of aluminum, iron, cobalt, molybdenum, chromium, vanadium, scandium and yttrium; wherein $0 \leq \delta \leq 0.1$ V is in the range $0 < V < 0.5$; W is in the range $0 < W \leq 0.5$; X is in the range $0 \leq X < 0.5$; Y is in the range $0 \leq Y < 0.5$; Z is $\geq 0$; and further wherein $V+W+X+Y+Z=1$. Such materials are useful, for example, as electrode materials in sodium ion battery applications.

15 Claims, 33 Drawing Sheets

(56) References Cited

U.S. PATENT DOCUMENTS

| | | | |
|---|---|---|---|
| 2010/0323232 A1* | 12/2010 | Kuze | H01M 2/1653 |
| | | | 429/144 |
| 2012/0028128 A1 | 2/2012 | Seino et al. | |
| 2012/0070743 A1 | 3/2012 | Kwon et al. | |
| 2012/0164533 A1 | 6/2012 | Senoue et al. | |
| 2012/0183837 A1 | 7/2012 | Johnson et al. | |
| 2012/0292561 A1 | 11/2012 | Sasaoka et al. | |
| 2012/0315530 A1 | 12/2012 | Kageura | |

FOREIGN PATENT DOCUMENTS

| | | |
|---|---|---|
| CN | 100521359 C | 7/2009 |
| CN | 102341941 A | 2/2012 |
| EP | 1130665 A1 | 9/2001 |
| EP | 2211405 A1 | 7/2010 |
| EP | 2323204 A1 | 5/2011 |
| EP | 2416411 A1 | 2/2012 |
| EP | 2541651 A1 | 1/2013 |
| JP | 2010235434 | 10/2010 |
| JP | 2011236117 | 4/2011 |
| WO | 02097907 A2 | 12/2002 |
| WO | 2010107084 A1 | 9/2010 |
| WO | 2011089958 A1 | 7/2011 |
| WO | 2011102497 A1 | 8/2011 |
| WO | 2013140174 A2 | 9/2013 |

OTHER PUBLICATIONS

International Search Report and Written Opinion, mailed Feb. 27, 2014, in International Application No. PCT/GB2013/052620.
International Preliminary Report on Patentability, mailed Nov. 26, 2014, and Applicant's Demand Under PCT Article 31, dated Jun. 27, 2014, in International Application No. PCT/GB2013/052620.
Komaba, et al., "Electrochemical Na Insertion and Solid Electrolyte Interphase for Hard-Carbon Electrodes and Application to Na-Ion Batteries," Advanced Functional Materials, 2011, vol. 21, pp. 3859-3867.
Padhi, et al., "Phospho-olivines as Positive-Electrode Materials for Rechargeable Lithium Batteries," Journal of Electrochemical Society, Apr. 1997, vol. 144, No. 4, pp. 1188-1194.
Toprakci, et al., "Fabrication and Electrochemical Characteristics of $LiFePO_4$ Powders for Lithium-Ion Batteries," KONA Powder and Particle Journal, 2010, No. 28, pp. 50-73.
Great Britain Intellectual Property Office Search Report for Great Britain Patent Application No. GB1212261.0, dated Oct. 23, 2012.
International Search Report and Written Opinion, mailed Oct. 9, 2013, in International Application No. PCT/GB2013/051822.
International Preliminary Report on Patentability, mailed Jun. 16, 2014, in International Application No. PCT/GB2013/051822.
Response to International Search Report and Written Opinion, dated Dec. 4, 2013, in International Application No. PCT/GB2013/051822.
International Search Report and Written Opinion, mailed Oct. 9, 2013, in International Application No. PCT/GB2013/051821.
International Preliminary Report on Patentability, mailed Jun. 16, 2014, in International Application No. PCT/GB2013/051821.
Response to International Search Report and Written Opinion, dated Dec. 4, 2013, in International Application No. PCT/GB2013/051821.
Great Britain Intellectual Property Office Search Report for Great Britain Patent Application No. GB1212263.6, dated Oct. 30, 2012.
International Search Report and Written Opinion, mailed Oct. 9, 2013, in International Application No. PCT/GB2013/051824.
Response to International Search Report and Written Opinion, dated Dec. 4, 2013, in International Application No. PCT/GB2013/051824.
International Preliminary Report on Patentability, mailed Jun. 16, 2014, in International Application No. PCT/GB2013/051824.
Kim, J.-H., et al., "Electrochemical performance of Li[LixNi(1−3x)/2Mn(1+x)/2]O2 cathode materials synthesized by a sol-gel method," Journal of Power Sources, Elsevier Science B.V., vol. 119-121, 2003, pp. 166-170.
Great Britain Intellectual Property Office Search Report for Great Britain Patent Application No. GB1212268.5, dated Oct. 23, 2012.
International Search Report and Written Opinion, mailed Oct. 9, 2013, in International Application No. PCT/GB2013/051808.
International Preliminary Report on Patentability, mailed Jun. 20, 2014, and Applicant's Demand Under PCT Article 31, dated Mar. 11, 2014, in International Application No. PCT/GB2013/051808.
Response to International Search Report and Written Opinion pursuant to PCT Article 19, dated Dec. 4, 2013, in International Application No. PCT/GB2013/051808.
Kim, D., et al., "Enabling Sodium Batteries Using Lithium-Substituted Sodium Layered Transition Metal Oxide Cathodes," Advanced Energy Materials, vol. 1, 2011, pp. 333-336.
Communication pursuant to Article 94(3) EPC issued by the European Patent Office on Feb. 22, 2016, in connection with European Application No. 13789884.7.
Second Office Action issued by the Chinese Patent Office on Mar. 18, 2016, in connection with Chinese Application No. 201380036339.0.
Myung et al., Synthesis of $LiNi0.5Mn0.5-x TixO2$ by an Emulsion Drying Method and Effect of Ti on Structure and Electrochemical Properties, Chem. Mater. 17:p. 2427-2435, 2005.
Final Office Action issued in co-pending U.S. Appl. No. 14/413,828, dated Feb. 9, 2017.
Non Final Office Action issued in co-pending U.S. Appl. No. 14/413,827, dated Apr. 27, 2017.
Final Office Action issued in co-pending U.S. Appl. No. 14/430,000 dated Feb. 21, 2017.
Lavela et al., "Nickel-stabilized composite manganese oxides as lithium insertion electrodes", J of Power Sources 84 1999, 75-79.
Non-Final Office Action issued in U.S. Appl. No. 14/430,000, dated Jun. 12, 2017.
First Office Action issued in Japanese Application No. 2015-521064, dated Jun. 6, 2017. English translation included.
Liu, D. et al, Comparison of structure and electrochemistry of Al- and Fe-doped $LiNi1/3Co1/3Mn1/3O2$, Electrochimica Acta, Jan. 17, 2006, vol. 51, No. 20, pp. 4199-4203, DOI:10.1016/j.electacta.2005.11.045.
Komaba, S. et al, Study on the Reversible Electrode Reaction of $Na1-xNi0.5Mn0.5O2$ for a Rechargeable Sodium-Ion Battery, Inorg. Chem., May 24, 2012, vol. 51, No. 11, pp. 6211-6220, DOI: 10.1021/ic300357d.
Takeda, Y. et al, Sodium deintercalation from sodium iron oxide, Materials Research Bulletin, Jun. 1994, vol. 29, Issue 6, pp. 659-666, DOI:10.1016/0025-5408(94)90122-8.

* cited by examiner

XRD of NaNi$_{0.45}$Mn$_{0.45}$Mg$_{0.05}$Ti$_{0.05}$O$_2$

XRD of NaNi$_{0.4}$Mn$_{0.4}$Mg$_{0.1}$Ti$_{0.1}$O$_2$

XRD of NaNi$_{0.35}$Mn$_{0.35}$Mg$_{0.15}$Ti$_{0.15}$O$_2$

XRD of NaNi$_{0.3}$Mn$_{0.3}$Mg$_{0.2}$Ti$_{0.2}$O$_2$

XRD of NaNi$_{0.4}$Mn$_{0.4}$Mg$_{0.05}$Ti$_{0.05}$Al$_{0.1}$O$_2$

XRD of NaNi$_{0.45}$Mn$_{0.45}$Cu$_{0.05}$Ti$_{0.05}$O$_2$

XRD of NaNi$_{0.4}$Mn$_{0.4}$Zn$_{0.1}$Ti$_{0.1}$O$_2$

XRD of $Na_{0.7}MnO_{2.05}$ $Na_{0.95}Ni_{0.3167}Ti_{0.3167}Mg_{0.1583}Mn_{0.2083}O_2$

DOPED NICKELATE COMPOUNDS

FIELD OF THE INVENTION

The present invention relates to novel doped nickelate compounds, their method of preparation, to novel electrodes which utilise an active material that comprises said doped nickelate compounds, and to the use of these electrodes, for example in an energy storage device.

BACKGROUND OF THE INVENTION

Sodium-ion batteries are analogous in many ways to the lithium-ion batteries that are in common use today; they are both reusable secondary batteries that comprise an anode (negative electrode), a cathode (positive electrode) and an electrolyte material, both are capable of storing energy, and they both charge and discharge via a similar reaction mechanism. When a sodium-ion (or lithium-ion battery) is charging, $Na^+$ (or $Li^+$) ions de-intercalate from the cathode and insert into the anode. Meanwhile charge balancing electrons pass from the cathode through the external circuit containing the charger and into the anode of the battery. During discharge the same process occurs but in the opposite direction.

Lithium-ion battery technology has enjoyed a lot of attention in recent years and provides the preferred portable battery for most electronic devices in use today; however lithium is not a cheap metal to source and is considered too expensive for use in large scale applications. By contrast sodium-ion battery technology is still in its relative infancy but is seen as advantageous; sodium is much more abundant than lithium and some researchers predict this will provide a cheaper and more durable way to store energy into the future, particularly for large scale applications such as storing energy on the electrical grid. Nevertheless a lot of work has yet to be done before sodium-ion batteries are a commercial reality.

$NaNi_{0.5}Mn_{0.5}O_2$ is a known Na-ion material in which the nickel is present as $Ni^{2+}$ while the manganese is present as $Mn^{4+}$. The material is ordered with the Na and Ni atoms residing in discrete sites within the structure. The nickel ions ($Ni^{2+}$) are a redox element which contributes to the reversible specific capacity and the manganese ions ($Mn^{4+}$) play the role of a structure stabilizer. Compound $NaNi_{0.5}Ti_{0.5}O_2$ is analogous to $NaNi_{0.5}Mn_{0.5}O_2$ in that the $Ni^{2+}$ ions provide the active redox centre and the $Ti^{4+}$ ions are present for structure stabilization. There is plenty of literature describing the preparation of $NaNi_{0.5}Mn_{0.5}O_2$ (and to a lesser extent $NaNi_{0.5}Ti_{0.5}O_2$) as the precursor for making $LiNi_{0.5}Mn_{0.5}O_2$ and $LiNi_{0.5}Ti_{0.5}O_2$ by Na→Li ion exchange for Li-ion applications. A direct synthesis method to make these Li materials may yield undesirable disordered materials, for example, as a result of the lithium and nickel atoms sharing structural sites. However, recent electrochemical studies reported by Komaba et al Adv. Funct. Mater. 2011, 21, 3859 describe the sodium insertion performance of hard-carbon and layered $NaNi_{0.5}Mn_{0.5}O_2$ electrodes in propylene carbonate electrolyte solutions. The results obtained show that although $NaNi_{0.5}Mn_{0.5}O_2$ exhibits some reversible charging and discharging ability, the capacity of the material fades by 25% or more, after only 40 cycles.

Work is now being undertaken to find even more efficient electrochemically active materials, which have large charge capacity, are capable of good cycling performance, highly stable, and of low toxicity and high purity. Of course, to be commercially successful, the cathode materials must also be easily and affordably produced. This long list of requirements is difficult to fulfil but it is understood from the literature that the active materials which are most likely to succeed are those with small particle size and narrow size distribution, with an optimum degree of crystallinity, a high specific surface area, and with uniform morphology.

The present Applicant has also now conducted work which demonstrates that electrochemical activity is further optimised when the active material includes metal constituents with certain defined oxidation states. Furthermore the Applicant has identified active materials with a specific crystal structure to be especially active.

The present invention aims to provide novel compounds. Further the present invention aims to provide a cost effective electrode that contains an active material that is straightforward to manufacture and easy to handle and store. Another aim of the present invention is to provide an electrode that has a high initial specific discharge capacity and which is capable of being recharged multiple times without significant loss in charge capacity.

Therefore, the first aspect of the present invention provides compounds of the formula:

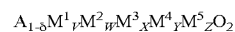

wherein
A is one or more alkali metals comprising sodium and/or potassium, either alone or in a mixture with lithium as a minor constituent;
$M^1$ is nickel in oxidation state +2
$M^2$ comprises a metal in oxidation state +4 selected from one or more of manganese, titanium and zirconium;
$M^3$ comprises a metal in oxidation state +2, selected from one or more of magnesium, calcium, copper, zinc and cobalt;
$M^4$ comprises a metal in oxidation state +4, selected from one or more of titanium, manganese and zirconium;
$M^5$ comprises a metal in oxidation state +3, selected from one or more of aluminium, iron, cobalt, molybdenum, chromium, vanadium, scandium and yttrium;
wherein
$0 \leq \delta \leq 0.1$
V is in the range $0 < V < 0.5$;
W is in the range $0 < W \leq 0.5$;
X is in the range $0 \leq X < 0.5$;
Y is in the range $0 \leq Y < 0.5$;
Z is $\geq 0$;
and further wherein $V+W+X+Y+Z=1$.

Preferably the present invention provides a compound of the above formula wherein V is in the range $0.1 \leq V \leq 0.45$; w is in the range $0 < W \leq 0.5$; x is in the range $0 \leq X < 0.5$; Y is in the range $0 \leq Y < 0.5$; Z is $\geq 0$; and wherein $V+W+X+Y+Z=1$.

Further preferably the present invention provides a compound of the above formula wherein V is in the range $0.3 \leq V < 0.45$; W is in the range $0.1 \leq W \leq 0.5$; X is in the range $0.05 \leq X < 0.45$; Y is in the range $0 \leq Y \leq 0.45$; Z is $\geq 0$; and wherein $V+W+X+Y+Z=1$.

In particularly preferred compounds of the above formula, V is in the range $0.3 \leq V < 0.45$; W is in the range $0 < W \leq 0.5$; X is in the range $0 \leq X \leq 0.3$; Y is in the range $0 \leq Y \leq 0.4$; and Z is in the range $0 \leq Z \leq 0.5$.

Compounds of the above formula in which $\delta=0.05$, are highly beneficial.

In additionally preferred compounds of the present invention $M^2 \neq M^4$.

It is particularly advantageous if $V+W+Y<0.9$ in the compounds of the present invention.

The present Applicant has found that not only are the oxidation states of the metal constituents in the compounds of the present invention a critical feature to the production of highly electrochemically active compounds but they have also confirmed that having metal constituents with these particular oxidation states will determine the overall crystalline structure of the compound. It is known that that there are several possible layered structural forms which alkali metal/metal/oxides may adopt, including O3, P3 and P2. The Applicant has shown that the oxidation states for the metal constituents cause a particular structure to be adopted and in particular has determined that alkali metal/metal/oxide compounds with a metal in +4 oxidation state and with a sodium content close to 1, will adopt an O3 crystalline structure. Moreover, the Applicant has demonstrated that alkali metal/metal/oxides with the metal in oxidation state +4 and with an O3 crystalline structure exhibit a much higher electrochemical activity than similar compounds that do not contain a metal in +4 oxidation state. The Applicant has also observed that the materials without a metal in +4 oxidation state, typically have a P2 crystalline structure, thus there appears to be a very strong correlation between crystalline structure, oxidation state and electrochemical activity.

Hence, the present invention provides preferred compounds of the formula:

$$A_{1-\delta}M^1{}_V M^2{}_W M^3{}_X M^4{}_Y M^5{}_Z O_2$$

in an O3 layered structural form
wherein
A is one or more alkali metals comprising sodium and/or potassium either alone or in a mixture with lithium as a minor constituent;
$M^1$ is nickel
$M^2$ comprises a metal selected from one or more of manganese, titanium and zirconium;
$M^3$ comprises a metal selected from one or more of magnesium, calcium, copper, zinc and cobalt;
$M^4$ comprises a metal selected from one or more of titanium, manganese and zirconium;
$M^5$ comprises a metal selected from one or more of aluminium, iron, cobalt, molybdenum, chromium, vanadium, scandium and yttrium.

Especially preferred compounds of the present invention include:
$NaNi_{0.5-x/2}Ti_{0.5-x/2}Al_xO_2$;
$NaNi_{0.5-x/2}Mn_{0.5-x/2}Al_xO_2$;
$NaNi_{0.5-x}Mn_{0.5-x}Mg_xTi_xO_2$;
$NaNi_{0.5-x}Mn_{0.5-x}Mg_{x/2}Ti_{x/2}Al_xO_2$;
$NaNi_{0.5-x}Mn_{0.5-x}Ca_xTi_xO_2$;
$NaNi_{0.5-x}Mn_{0.5-x}Co_xTi_xO_2$;
$NaNi_{0.5-x}Mn_{0.5-x}Cu_xTi_xO_2$;
$NaNi_{0.5-x}Mn_{0.5-x}Zn_xTi_xO_2$;
$NaNi_{0.5-x}Mn_{0.5-x}Mg_xZr_xO_2$;
$NaNi_{0.5-x}Mn_{0.25-x/2}Ca_xTi_{0.25+x/2}O_2$;
$NaNi_{0.5-x}Mn_{0.5}Ca_xO_2$;
$NaNi_{0.5-x}Mn_{0.5-y}Ca_xTi_yO_2$;
$NaNi_{0.5-x}Ti_{0.5-x}Mg_xMn_xO_2$;
$NaNi_{0.5-x}Ti_{0.5-x}Ca_xMn_xO_2$;
$NaNi_{0.5-x}Ti_{0.5-x}Cu_xMn_xO_2$;
$NaNi_{0.5-x}Ti_{0.5-x}Co_xMn_xO_2$;
$NaNi_{0.5-x}Ti_{0.5-x}Zn_xMn_xO_2$;
$NaNi_{0.5-x}Mn_{0.5}Mg_xO_2$;
$NaNi_{0.5-x}Mn_{0.5}Ca_xO_2$;
$NaNi_{0.5-x}Mn_{0.5}Cu_xO_2$;
$NaNi_{0.5-x}Mn_{0.5}Co_xO_2$;
$NaNi_{0.5-x}Mn_{0.5}Zn_xO_2$;
$NaNi_{0.5-x}Mn_{0.5-y}Mg_xTi_yO_2$;
$NaNi_{0.5-x}Mn_{0.5-y}Ca_xTi_yO_2$;
$NaNi_{0.5-x}Mn_{0.5-y}Cu_xTi_yO_2$;
$NaNi_{0.5-x}Mn_{0.5-y}Co_xTi_yO_2$;
$NaNi_{0.5-x}Mn_{0.5-y}Zn_xTi_yO_2$;
$NaNi_{0.5-x}Mn_{0.25-x/2}Mn_{0.25-x/2}O_2$;
$NaNi_{0.5-x}Mn_{0.25-x/2}Ca_xTi_{0.25+x/2}O_2$;
$NaNi_{0.5-x}Mn_{0.25-x/2}Cu_xTi_{0.25+x/2}O_2$;
$NaNi_{0.5-x}Mn_{0.25-x/2}Co_xTi_{0.25+x/2}O_2$;
$NaNi_{0.5-x}Mn_{0.25-x/2}Zn_xTi_{0.25+x/2}O_2$;
$NaNi_{0.5-x}Mn_{0.5-x}Mg_{X/2}Ti_{x/2}Al_xO_2$;
$NaNi_{0.5-x}Mn_{0.5-x}Ca_{x/2}Ti_{x/2}Al_xO_2$;
$NaNi_{0.5-x}Mn_{0.5-x}Cu_{x/2}Ti_{x/2}Al_xO_2$;
$NaNi_{0.5-x}Mn_{0.5-x}Co_{x/2}Ti_{x/2}Al_xO_2$;
$NaNi_{0.5-x}Mn_{0.5-x}Zn_{x/2}Ti_{x/2}Al_xO_2$; and
$Na_{0.95}Ni_{0.3167}Ti_{0.3167}Mg_{0.1583}Mn_{0.2083}O_2$ Further, extremely preferred compounds of the present invention include:
$NaNi_{0.45}Mn_{0.45}Mg_{0.05}Ti_{0.05}O_2$;
$NaNi_{0.45}Mn_{0.45}Ca_{0.05}Ti_{0.05}O_2$;
$NaNi_{0.45}Mn_{0.45}Cu_{0.05}Ti_{0.05}O_2$;
$NaNi_{0.45}Mn_{0.45}Zn_{0.05}Ti_{0.05}O_2$ and
$Na_{0.95}Ni_{0.3167}Ti_{0.3167}Mg_{0.1583}Mn_{0.2083}O_2$ In a second aspect, the present invention provides an electrode comprising an active compound of the formula:

$$A_{1-\delta}M^1{}_V M^2{}_W M^3{}_X M^4{}_Y M^5{}_Z O_2$$

wherein
A is one or more alkali metals comprising sodium and/or potassium either alone or in a mixture with lithium as a minor constituent;
$M^1$ is nickel in oxidation state +2
$M^2$ comprises a metal in oxidation state +4 selected from one or more of manganese, titanium and zirconium;
$M^3$ comprises a metal in oxidation state +2, selected from one or more of magnesium, calcium, copper, zinc and cobalt;
$M^4$ comprises a metal in oxidation state +4, selected from one or more of titanium, manganese and zirconium;
$M^5$ comprises a metal in oxidation state +3, selected from one or more of aluminium, iron, cobalt, molybdenum, chromium, vanadium, scandium and yttrium;
wherein
$0 \leq \delta \leq 0.1$
V is in the range $0<V<0.5$;
W is in the range $0<W \leq 0.5$;
X is in the range $0 \leq X<0.5$;
Y is in the range $0 \leq Y<0.5$;
Z is $\geq 0$;
and further wherein $V+W+X+Y+Z=1$.

Preferably the electrode of the present invention comprises an active compound of the above formula, wherein V is in the range $0.1 \leq V \leq 0.45$; w is in the range $0<W \leq 0.5$; x is in the range $0 \leq X<0.5$; Y is in the range $0 \leq Y<0.5$; Z is $\geq 0$; and wherein $V+W+X+Y+Z=1$.

Further preferably the electrode of the present invention comprises an active compound of the above formula, wherein V is in the range $0.3 \leq V \leq 0.45$; W is in the range $0.1 \leq W \leq 0.5$; X is in the range $0.05 \leq X<0.45$; Y is in the range $0 \leq Y \leq 0.45$; Z is $\geq 0$; and wherein $V+W+X+Y+Z=1$.

Particularly preferred electrodes of the present invention comprise an active compound of the above formula, wherein V is in the range $0.3 \leq V<0.45$; W is in the range $0<W \leq 0.5$; X is in the range $0 \leq X \leq 0.3$; Y is in the range $0 \leq Y \leq 0.4$; and Z is in the range $0 \leq Z \leq 0.5$.

The Applicant has observed that if NiO is present as an impurity phase in samples of the active compounds, then this has a detrimental effect on the electrochemical performance.

NiO may be formed during the process of charging the electrode; at this time Ni2+ can be oxidized, using up energy that would normally be used to charge the active material. This is not only an irreversible reaction, but also has a detrimental effect on the cycling performance, resulting in a drop in capacity upon electrochemical cycling. The formation of NiO by this route is found to be minimised by reducing the amount of alkali metal in the active compound and is the purpose for compounds of the invention which have less than 1 unit of alkali metal. However, it is important to maintain sufficient alkali metal in the compound to ensure that it adopts a favourable crystalline structure such as an O3 type structure.

Electrodes comprising active compounds of the above formula in which δ=0.05, are highly beneficial.

Additionally preferred electrodes of the present invention comprise an active compound as described above wherein $M^2 \neq M^4$.

Further preferred electrodes of the present invention comprise compounds of the formula:

$$A_{1-\delta}M^1{}_V M^2{}_W M^3{}_X M^4{}_Y M^5{}_Z O_2$$

in an O3 layered structural form
wherein
  A is one or more alkali metals comprising sodium and/or potassium either alone or in a mixture with lithium as a minor constituent;
  $M^1$ is nickel
  $M^2$ comprises a metal selected from one or more of manganese, titanium and zirconium;
  $M^3$ comprises a metal selected from one or more of magnesium, calcium, copper, zinc and cobalt;
  $M^4$ comprises a metal selected from one or more of titanium, manganese and zirconium;
  $M^5$ comprises a metal selected from one or more of aluminium, iron, cobalt, molybdenum, chromium, vanadium, scandium and yttrium.

Especially preferred electrodes of the present invention comprise active compounds selected from one or more of:
$NaNi_{0.5-x/2}Ti_{0.5-x/2}Al_xO_2$;
$NaNi_{0.5-x/2}Mn_{0.5-x/2}Al_xO_2$;
$NaNi_{0.5-x}Mn_{0.5-x}Mg_xTi_xO_2$;
$NaNi_{0.5-x}Mn_{0.5-x}Mg_{x/2}Ti_{x/2}Al_xO_2$;
$NaNi_{0.5-x}Mn_{0.5-x}Ca_xTi_xO_2$;
$NaNi_{0.5-x}Mn_{0.5-x}Co_xTi_xO_2$;
$NaNi_{0.5-x}Mn_{0.5-x}Cu_xTi_xO_2$;
$NaNi_{0.5-x}Mn_{0.5-x}Mn_xTi_xO_2$;
$NaNi_{0.5-x}Mn_{0.5-x}Mg_xZr_xO_2$;
$NaNi_{0.5-x}Mn_{0.25-x/2}Ca_xTi_{0.25+x/2}O_2$;
$NaNi_{0.5-x}Mn_{0.5}Ca_xO_2$;
$NaNi_{0.5-x}Mn_{0.5-y}Ca_xTi_yO_2$;
$NaNi_{0.5-x}Ti_{0.5-x}Mg_xMn_xO_2$;
$NaNi_{0.5-x}Ti_{0.5-x}Ca_xMn_xO_2$;
$NaNi_{0.5-x}Ti_{0.5-x}Cu_xMn_xO_2$;
$NaNi_{0.5-x}Ti_{0.5-x}Co_xMn_xO_2$;
$NaNi_{0.5-x}Ti_{0.5-x}Zn_xMn_xO_2$;
$NaNi_{0.5-x}Mn_{0.5}Mg_xO_2$;
$NaNi_{0.5-x}Mn_{0.5}Ca_xO_2$;
$NaNi_{0.5-x}Mn_{0.5}Cu_xO_2$;
$NaNi_{0.5-x}Mn_{0.5}Co_xO_2$;
$NaNi_{0.5-x}Mn_{0.5}Zn_xO_2$;
$NaNi_{0.5-x}Mn_{0.5-y}Mg_xTi_yO_2$;
$NaNi_{0.5-x}Mn_{0.5-y}Ca_xTi_yO_2$;
$NaNi_{0.5-x}Mn_{0.5-y}Cu_xTi_yO_2$;
$NaNi_{0.5-x}Mn_{0.5-y}Co_xTi_yO_2$;
$NaNi_{0.5-x}Mn_{0.5-y}Zn_xTi_yO_2$;
$NaNi_{0.5-x}Mn_{0.25-x/2}Mg_xTi_{0.25+x/2}O_2$;
$NaNi_{0.5-x}Mn_{0.25-x/2}Ca_xTi_{0.25+x/2}O_2$;
$NaNi_{0.5-x}Mn_{0.25-x/2}Cu_xTi_{0.25+x/2}O_2$;
$NaNi_{0.5-x}Mn_{0.25-x/2}Co_xTi_{0.25+x/2}O_2$;
$NaNi_{0.5-x}Mn_{0.25-x/2}Zn_xTi_{0.25+x/2}O_2$;
$NaNi_{0.5-x}Mn_{0.5-x}Mg_{x/2}Ti_{x/2}Al_xO_2$;
$NaNi_{0.5-x}Mn_{0.5-x}Ca_{x/2}Ti_{x/2}Al_xO_2$;
$NaNi_{0.5-x}Mn_{0.5-x}Cu_{x/2}Ti_{x/2}Al_xO_2$;
$NaNi_{0.5-x}Mn_{0.5-x}Co_{x/2}Ti_{x/2}Al_xO_2$;
$NaNi_{0.5-x}Mn_{0.5-x}Zn_{x/2}Ti_{x/2}Al_xO_2$; and
$Na_{0.95}Ni_{0.3167}Ti_{0.3167}Mg_{0.1583}Mn_{0.2083}O_2$.

Extremely preferred electrodes comprise active compounds selected from one or more of:
$NaNi_{0.45}Mn_{0.45}Mg_{0.05}Ti_{0.05}O_2$;
$NaNi_{0.45}Mn_{0.45}Ca_{0.05}Ti_{0.05}O_2$;
$NaNi_{0.45}Mn_{0.45}Cu_{0.05}Ti_{0.05}O_2$;
$NaNi_{0.45}Mn_{0.45}Zn_{0.05}Ti_{0.05}O_2$, and
$Na_{0.95}Ni_{0.3167}Ti_{0.3167}Mg_{0.1583}Mn_{0.2083}O_2$.

The electrodes according to the present invention are suitable for use in many different applications, for example energy storage devices, rechargeable batteries, electrochemical devices and electrochromic devices.

Advantageously, the electrodes according to the invention are used in conjunction with a counter electrode and one or more electrolyte materials. The electrolyte materials may be any conventional or known materials and may comprise either aqueous electrolyte(s) or non-aqueous electrolyte(s) or mixtures thereof.

In a third aspect, the present invention provides an energy storage device that utilises an electrode comprising the active materials described above, and particularly an energy storage device for use as one or more of the following: a sodium and/or potassium ion cell; a sodium and/or potassium metal cell; a non-aqueous electrolyte sodium and/or potassium ion; an aqueous electrolyte sodium and/or potassium ion cell. In each case lithium may also be present as a minor constituent.

The novel compounds of the present invention may be prepared using any known and/or convenient method. For example, the precursor materials may be heated in a furnace so as to facilitate a solid state reaction process.

A fourth aspect of the present invention provides a particularly advantageous method for the preparation of the compounds described above comprising the steps of:
a) mixing the starting materials together, preferably intimately mixing the starting materials together and further preferably pressing the mixed starting materials into a pellet;
b) heating the mixed starting materials in a furnace at a temperature of between 400° C. and 1500° C., preferably a temperature of between 500° C. and 1200° C., for between 2 and 20 hours; and
c) allowing the reaction product to cool.

Preferably the reaction is conducted under an atmosphere of ambient air, and alternatively under an inert gas.

BRIEF DESCRIPTION OF THE DRAWINGS

The present invention will now be described with reference to the following figures in which.

DETAILED DESCRIPTION

Figure 1A:
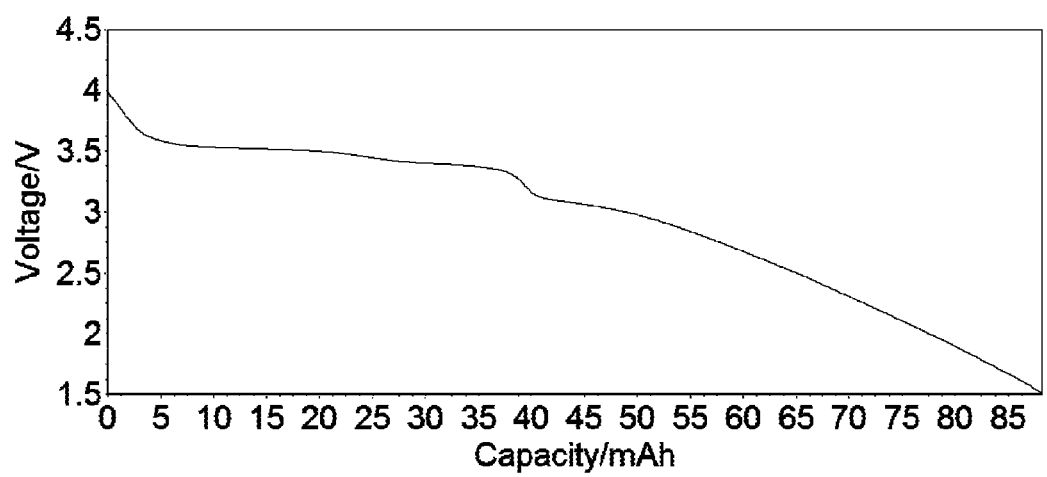
FIG. 1(A) shows the third Cycle Discharge Voltage Profile (Na-ion Cell Voltage [V] versus Cathode Specific Capacity [mAh/g]) for prior art cathode material, $NaNi_{0.5}Mn_{0.5}O_2$, prepared according to Example 1.
Figure 1B:
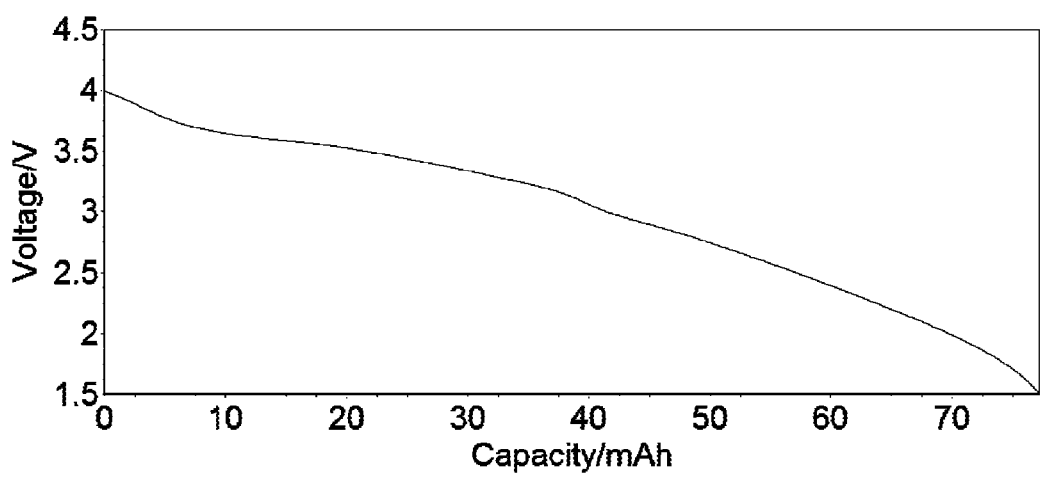
FIG. 1(B) shows the third Cycle Discharge Voltage Profile (Na-ion Cell Voltage [V] versus Cathode Specific Capacity [mAh/g]) for cathode material $NaNi_{0.45}Mn_{0.45}Mg_{0.05}Ti_{0.05}O_2$ according to the present invention and prepared according to Example 2.
Figure 1C:
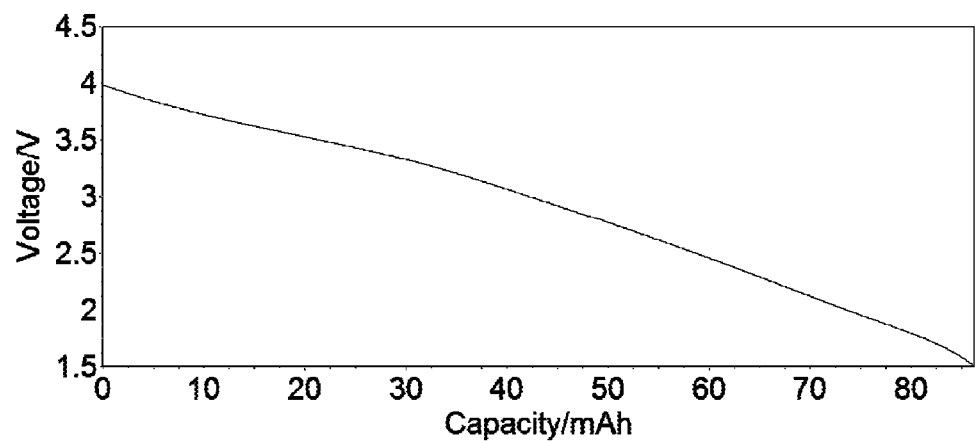
FIG. 1(C) shows the third Cycle Discharge Voltage Profile (Na-ion Cell Voltage [V] versus Cathode Specific Capacity [mAh/g]) for cathode material $NaNi_{0.40}Mn_{0.40}Mg_{0.10}Ti_{0.10}O_2$ according to the present invention and prepared according to Example 3.
Figure 1D:
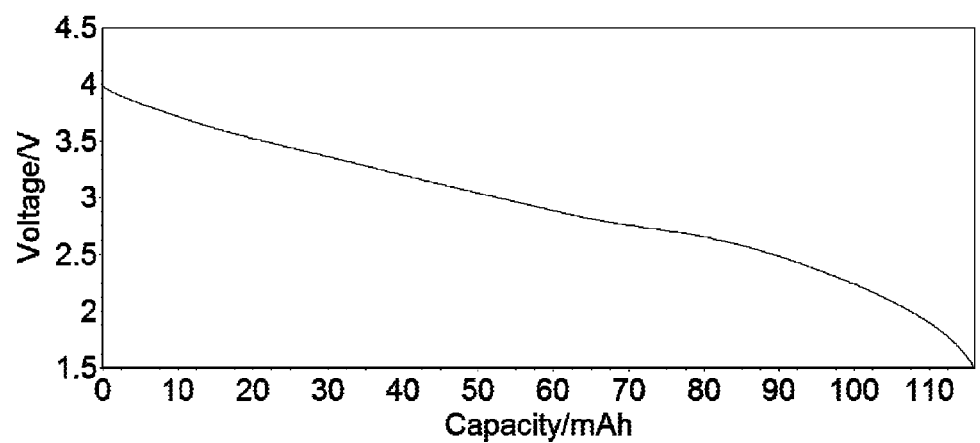
FIG. 1(D) shows the third Cycle Discharge Voltage Profile (Na-ion Cell Voltage [V] versus Cathode Specific Capacity [mAh/g]) for cathode material $NaNi_{0.35}Mn_{0.35}Mg_{0.15}Ti_{0.15}O_2$ according to the present invention and prepared according to Example 4.
Figure 1E:
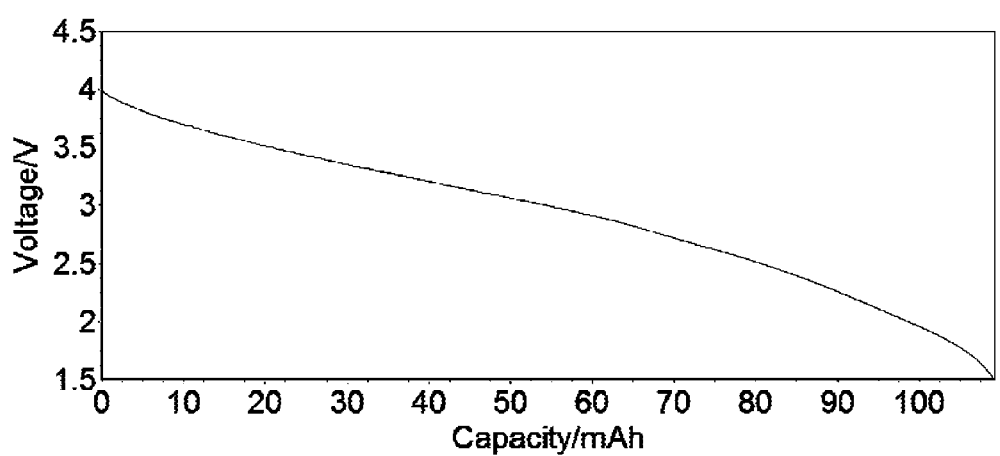
FIG. 1(E) shows the third Cycle Discharge Voltage Profile (Na-ion Cell Voltage [V] versus Cathode Specific Capacity [mAh/g]) for cathode material $NaNi_{0.30}Mn_{0.30}Mg_{0.20}Ti_{0.20}O_2$ according to the present invention and prepared according to Example 5.
Figure 2A:
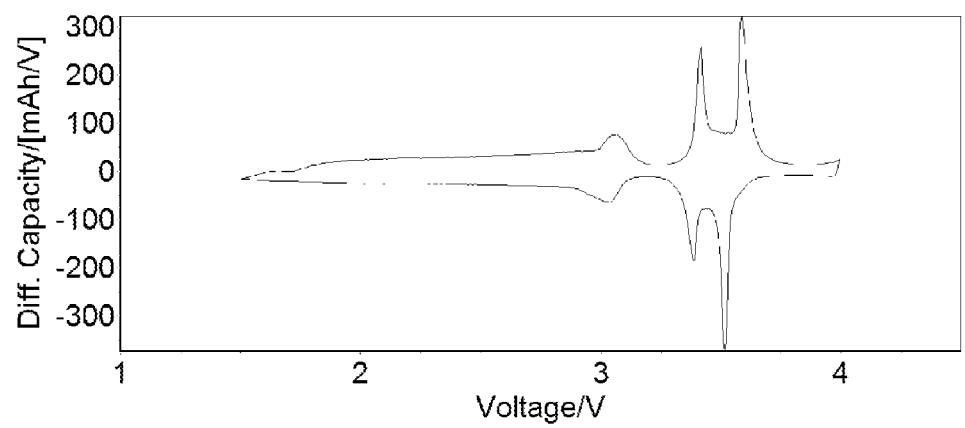
FIG. 2(A) shows the third Cycle Differential Capacity Profiles (Differential Capacity [mAh/g/V] versus Na-ion Cell Voltage [V]) for prior art cathode material $NaNi_{0.5}Mn_{0.5}O_2$, prepared according to Example 1.
Figure 2B:
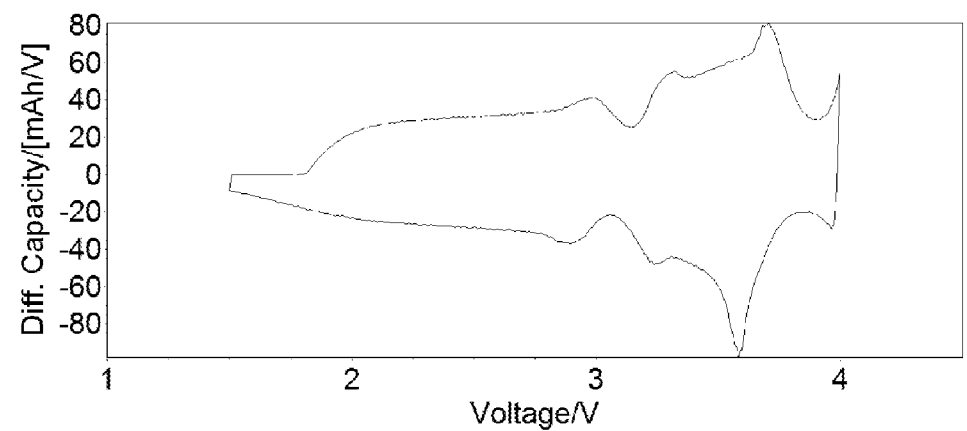
FIG. 2(B) shows the third Cycle Differential Capacity Profiles (Differential Capacity [mAh/g/V] versus Na-ion Cell Voltage [V]) for cathode material $NaNi_{0.45}Mn_{0.45}Mg_{0.05}Ti_{0.05}O_2$ according to the present invention and prepared according to Example 2.
Figure 2C:
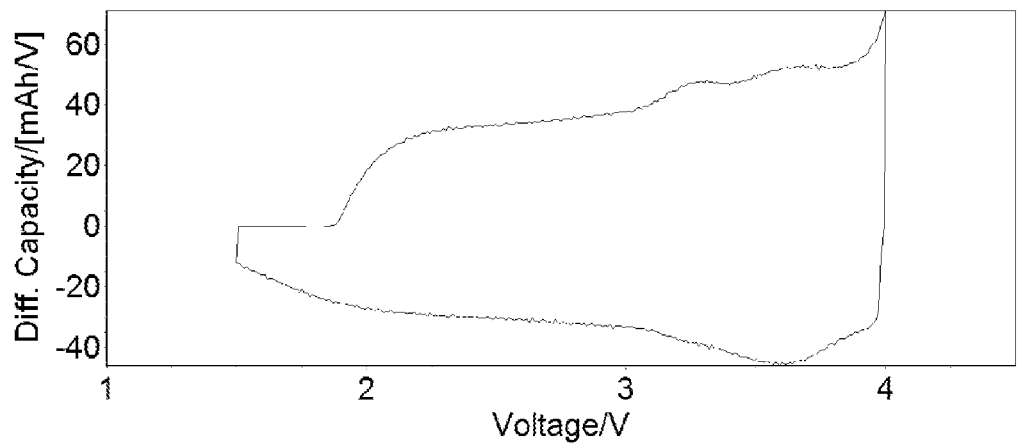
FIG. 2(C) shows the third Cycle Differential Capacity Profiles (Differential Capacity [mAh/g/V] versus Na-ion Cell Voltage [V]) for cathode material $NaNi_{0.40}Mn_{0.40}Mg_{0.10}Ti_{0.10}O_2$ according to the present invention and prepared according to Example 3.
Figure 2D:
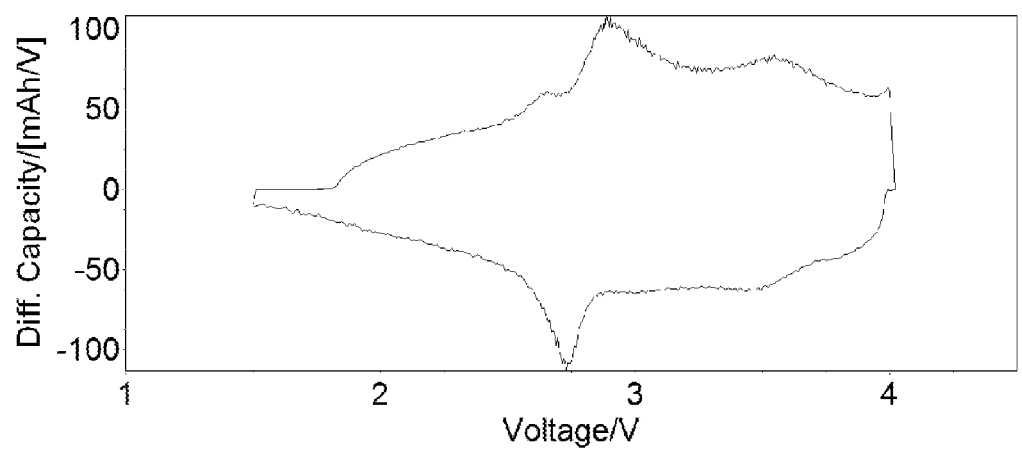
FIG. 2(D) shows the third Cycle Differential Capacity Profiles (Differential Capacity [mAh/g/V] versus Na-ion Cell Voltage [V]) for cathode material $NaNi_{0.35}Mn_{0.35}Mg_{0.15}Ti_{0.15}O_2$ according to the present invention and prepared according to Example 4.
Figure 2E:
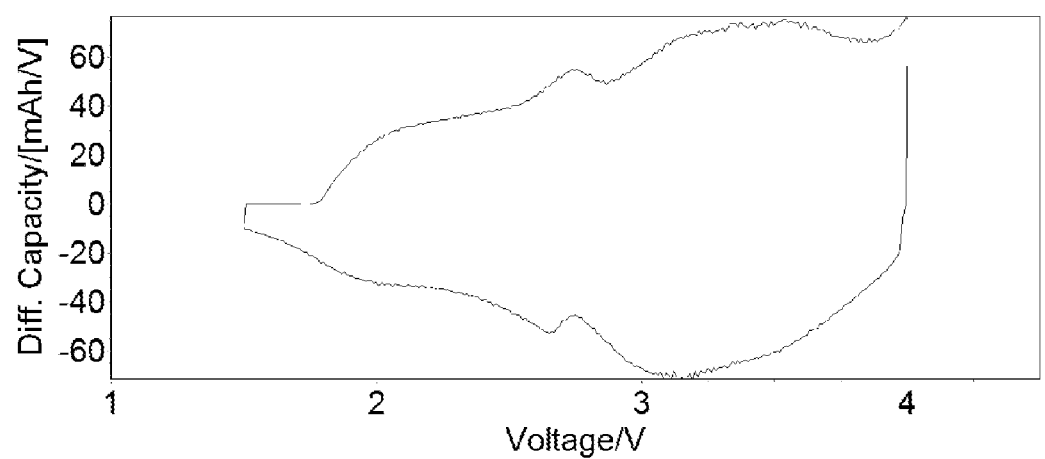
FIG. 2(E) shows the third Cycle Differential Capacity Profiles (Differential Capacity [mAh/g/V] versus Na-ion Cell Voltage [V]) for cathode material $NaNi_{0.30}Mn_{0.30}Mg_{0.20}Ti_{0.20}O_2$ according to the present invention and prepared according to Example 5.
Figure 3A:
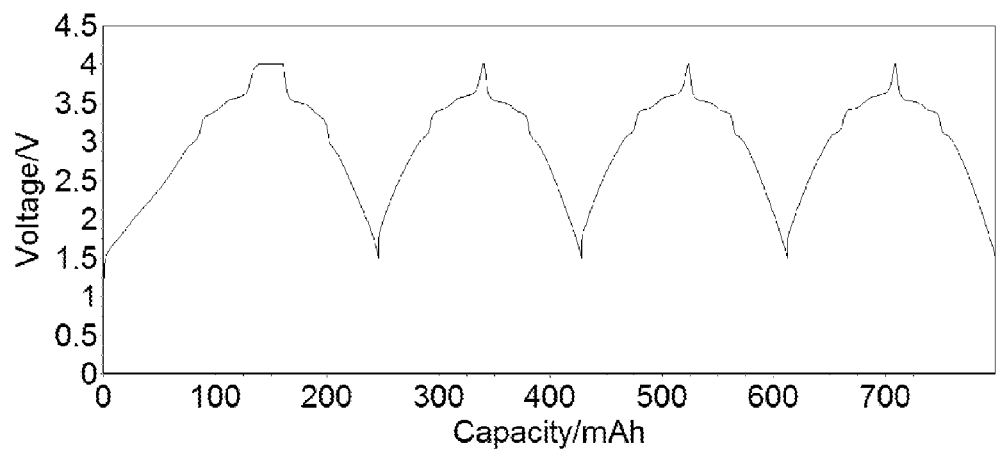
FIG. 3(A) shows Charge-Discharge Voltage Profiles for first 4 cycles (Na-ion Cell Voltage [V] versus Cumulative Cathode Specific Capacity [mAh/g]) for prior art cathode material $NaNi_{0.5}Mn_{0.5}O_2$, prepared according to Example 1.
Figure 3B:
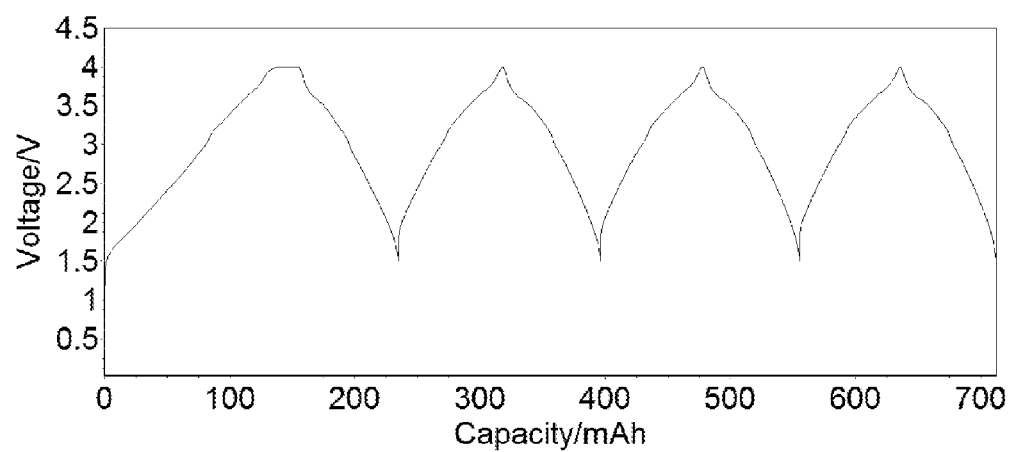
FIG. 3(B) shows Charge-Discharge Voltage Profiles for first 4 cycles (Na-ion Cell Voltage [V] versus Cumulative Cathode Specific Capacity [mAh/g]) for cathode material $NaNi_{0.45}Mn_{0.45}Mg_{0.05}Ti_{0.05}O_2$, according to the present invention and prepared according to Example 2.
Figure 3C:
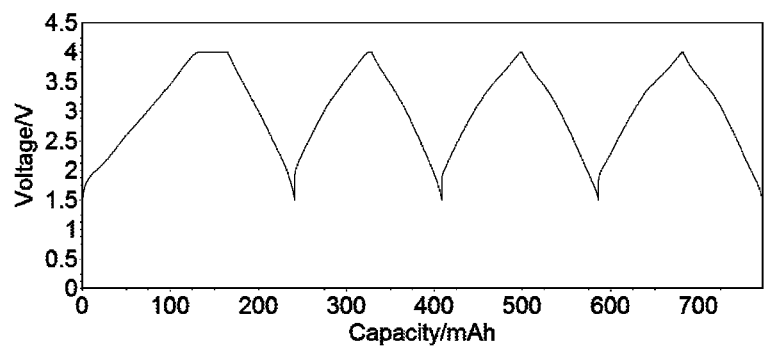
FIG. 3(C) shows Charge-Discharge Voltage Profiles for first 4 cycles (Na-ion Cell Voltage [V] versus Cumulative Cathode Specific Capacity [mAh/g]) for cathode material $NaNi_{0.40}Mn_{0.40}Mg_{0.10}Ti_{0.10}O_2$, according to the present invention and prepared according to Example 3.
Figure 3D:
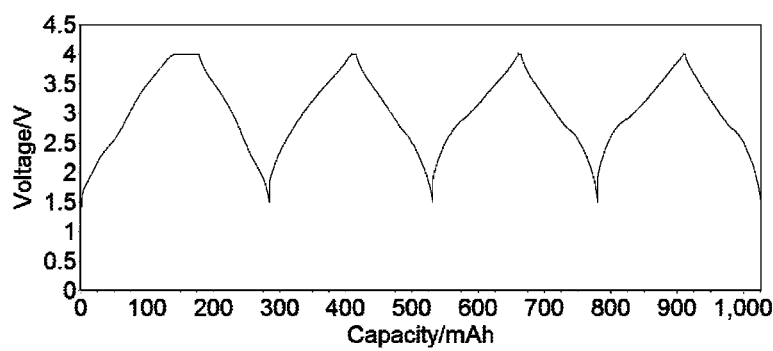
FIG. 3(D) shows Charge-Discharge Voltage Profiles for first 4 cycles (Na-ion Cell Voltage [V] versus Cumulative Cathode Specific Capacity [mAh/g]) for cathode material $NaNi_{0.35}Mn_{0.35}Mg_{0.15}Ti_{0.15}O_2$, according to the present invention and prepared according to Example 4.
Figure 3E:
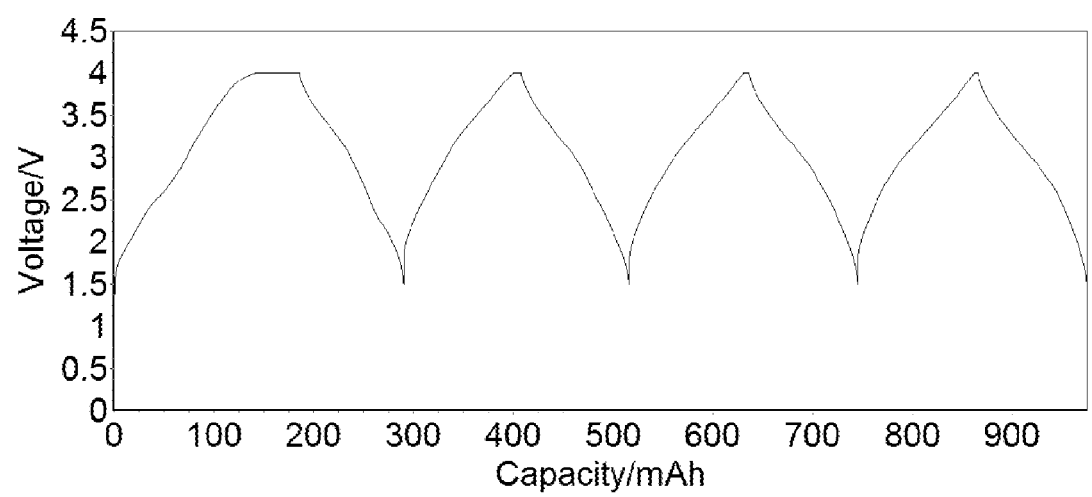
FIG. 3(E) shows Charge-Discharge Voltage Profiles for first 4 cycles (Na-ion Cell Voltage [V] versus Cumulative Cathode Specific Capacity [mAh/g]) for cathode material $NaNi_{0.30}Mn_{0.30}Mg_{0.20}Ti_{0.20}O_2$, according to the present invention and prepared according to Example 5.

The materials according to the present invention are prepared using the following generic method:

Generic Synthesis Method:

Stoichiometric amounts of the precursor materials are intimately mixed together and pressed into a pellet. The resulting mixture is then heated in a tube furnace or a chamber furnace using either an ambient air atmosphere, or a flowing inert atmosphere (e.g. argon or nitrogen), at a furnace temperature of between 400° C. and 1500° C. until reaction product forms; for some materials a single heating step is used and for others (as indicated below in Table 1) more than one heating step is used. When cool, the reaction product is removed from the furnace and ground into a powder.

Using the above method, active materials were prepared, Examples 1 to 14, as summarised below in Table 1:

TABLE 1

| EXAMPLE | TARGET COMPOUND | STARTING MATERIALS | FURNACE CONDITIONS |
|---|---|---|---|
| 1 | NaNi$_{0.5}$Mn$_{0.5}$O$_2$<br>Prior art | Na$_2$CO$_3$,<br>NiCO$_3$,<br>MnO$_2$ | 1) Air/700° C., dwell time of 8 hours.<br>2) Air/900° C., dwell time of 8 hours. |
| 2 | NaNi$_{0.45}$Mn$_{0.45}$Mg$_{0.05}$Ti$_{0.05}$O$_2$ | Na$_2$CO$_3$<br>NiCO$_3$<br>Mg(OH)$_2$<br>MnO$_2$<br>TiO$_2$ | 1) Air/800° C., dwell time of 8 hours.<br>2) Air/900° C., dwell time of 8 hours. |
| 3 | NaNi$_{0.40}$Mn$_{0.40}$Mg$_{0.10}$Ti$_{0.10}$O$_2$ | Na$_2$CO$_3$<br>NiCO$_3$<br>Mg(OH)$_2$<br>MnO$_2$<br>TiO$_2$ | 1) Air/800° C., dwell time of 8 hours.<br>2) Air/900° C., dwell time of 8 hours. |
| 4 | NaNi$_{0.35}$Mn$_{0.35}$Mg$_{0.15}$Ti$_{0.15}$O$_2$ | Na$_2$CO$_3$<br>NiCO$_3$<br>MnO$_2$<br>Mg(OH)$_2$<br>TiO$_2$ | 1) Air/900° C., dwell time of 8 hours.<br>2) Air/900° C., dwell time of 8 hours. |
| 5 | NaNi$_{0.30}$Mn$_{0.30}$Mg$_{0.20}$Ti$_{0.20}$O$_2$ | Na$_2$CO$_3$<br>NiCO$_3$<br>MnO$_2$<br>Mg(OH)$_2$<br>TiO$_2$ | 1) Air/900° C., dwell time of 8 hours<br>2) Air/900° C., dwell time of 8 hours. |
| 6 | NaNi$_{0.5}$Ti$_{0.5}$O$_2$<br>Prior art | Na$_2$CO$_3$<br>NiCO$_3$<br>TiO$_2$ | 1) Air/900° C., dwell time of 8 hours<br>2) Air/900° C., dwell time of 8 hours. |

TABLE 1-continued

| EXAMPLE | TARGET COMPOUND | STARTING MATERIALS | FURNACE CONDITIONS |
|---|---|---|---|
| 7 | $NaNi_{0.40}Ti_{0.50}Mg_{0.10}O_2$ | $Na_2CO_3$<br>$NiCO_3$,<br>$TiO_2$,<br>$Mg(OH)_2$ | 1) Air/900° C., dwell time of 8 hours<br>2) /900° C., dwell time of 8 hours. |
| 8 | $NaNi_{0.40}Ti_{0.40}Mg_{0.10}Mn_{0.10}O_2$ | $Na_2CO_3$,<br>$NiCO_3$,<br>$TiO_2$,<br>$Mg(OH)_2$,<br>$MnO_2$ | 1) Air/900° C., dwell time of 8 hours<br>2) Air/900° C., dwell time of 8 hours. |
| 9 | $NaNi_{0.40}Mn_{0.40}Mg_{0.05}Ti_{0.05}Al_{0.1}O_2$ | $Na_2CO_3$<br>$NiCO_3$<br>$Mg(OH)_2$<br>$MnO_2$<br>$TiO_2$<br>$Al(OH)_3$ | 1) Air/800° C., dwell time of 8 hours<br>2) Air/900° C., dwell time of 8 hours. |
| 10 | $NaNi_{0.45}Mn_{0.45}Cu_{0.05}Ti_{0.05}O_2$ | $Na_2CO_3$,<br>$NiCO_3$,<br>$MnO_2$<br>$CuO$<br>$TiO_2$ | 1) Air/900° C., dwell time of 8 hours<br>2) Air/900° C., dwell time of 8 hours. |
| 11 | $NaNi_{0.40}Mn_{0.40}Ca_{0.10}Ti_{0.10}O_2$ | $Na_2CO_3$,<br>$NiCO_3$,<br>$MnO_2$<br>$CaCO_3$<br>$TiO_2$ | 1) Air/900° C., dwell time of 8 hours<br>2) Air/900° C., dwell time of 8 hours.<br>3) Air/950° C., dwell time of 8 hours. |
| 12 | $NaNi_{0.40}Mn_{0.40}Zn_{0.10}Ti_{0.10}O_2$ | $Na_2CO_3$<br>$NiCO_3$<br>$MnO_2$<br>$CuO$<br>$TiO_2$ | 1) Air/900° C., dwell time of 8 hours<br>2) Air/900° C., dwell time of 8 hours. |
| 13 Comparative | $Na_{0.7}MnO_{2.05}$ | 0.7 $Na_2CO_3$<br>0.5 $Mn_2O_3$ | Mixing solvent acetone<br>700° C. in air, dwell time of 10 hours<br>700° C. in air, dwell time of 10 hours<br>800° C. in air, dwell time of 20 hours<br>900° C. in air, dwell time of 8 hours<br>1000° C. in air, dwell time of 8 hours<br>(sample reground and repelletised between each firing) |
| 14 | $Na_{0.95}Ni_{0.3167}Ti_{0.3167}Mg_{0.1583}Mn_{0.2083}O_2$ | 0.475 $Na_2CO_3$<br>0.3167 $NiCO_3$<br>0.3167 $TiO_2$<br>0.2083 $MnO_2$<br>0.1583 $Mg(OH)_2$ | Mixing Solvent: Acetone<br>900° C. in air, dwell time of 8 hours |

Product Analysis Using XRD

All of the product materials were analysed by X-ray diffraction techniques using a Siemens D5000 powder diffractometer to confirm that the desired target materials had been prepared, to establish the phase purity of the product material and to determine the types of impurities present. From this information it is possible to determine the unit cell lattice parameters.

The operating conditions used to obtain the XRD spectra illustrated in FIGS. 12(A)-12(G), and FIGS. 13(A) and 14(A) are as follows:

Slits sizes: 1 mm, 1 mm, 0.1 mm
Range: $2\theta = 5°-60°$
X-ray Wavelength=1.5418 Å (Angstoms)-(Cu Kα)
Speed: 0.5 seconds/step
Increment: 0.015°

Electrochemical Results

The target materials were tested either i) using a lithium metal anode test cell, or ii) using a Na-ion test cell using a hard carbon anode. It is also possible to test using a Li-ion cell with a graphite anode. Cells may be made using the following procedures:

A Na-ion electrochemical test cell containing the active material is constructed as follows:

Generic Procedure to Make a Hard Carbon Na-Ion Cell

The positive electrode is prepared by solvent-casting a slurry of the active material, conductive carbon, binder and solvent. The conductive carbon used is Super P (Timcal). PVdF co-polymer (e.g. Kynar Flex 2801, Elf Atochem Inc.) is used as the binder, and acetone is employed as the solvent. The slurry is then cast onto glass and a free-standing electrode film is formed as the solvent evaporates. The electrode is then dried further at about 80° C. The electrode film contains the following components, expressed in percent by weight: 80% active material, 8% Super P carbon, and 12% Kynar 2801 binder. Optionally, an aluminium current collector may be used to contact the positive electrode.

The negative electrode is prepared by solvent-casting a slurry of the hard carbon active material (Carbotron P/J, supplied by Kureha), conductive carbon, binder and solvent. The conductive carbon used is Super P (Timcal). PVdF co-polymer (e.g. Kynar Flex 2801, Elf Atochem Inc.) is used as the binder, and acetone is employed as the solvent. The slurry is then cast onto glass and a free-standing electrode film is formed as the solvent evaporates. The electrode is then dried further at about 80° C. The electrode film contains the following components, expressed in percent by weight: 84% active material, 4% Super P carbon, and 12% Kynar 2801 binder. Optionally, a copper current collector may be used to contact the negative electrode.

Cell Testing

The cells are tested as follows, using Constant Current Cycling techniques.

The cell is cycled at a given current density between pre-set voltage limits. A commercial battery cycler from Maccor Inc. (Tulsa, Okla., USA) is used. On charge, sodium (lithium) ions are extracted from the cathode active material. During discharge, sodium (lithium) ions are re-inserted into the cathode active material.

Results:

Referring to FIGS. 1(A)-1(E).

FIGS. 1(A), 1(B), 1(C), 1(D) and 1(E) show the third cycle discharge voltage profiles (Na-ion Cell Voltage [V] versus Cathode Specific Capacity [mAh/g]) for several Hard Carbon//$NaNi_{0.5-x}(Mn_{0.5-x}Mg_xTi_xO_2$ cells. The cathode materials used to make these cells were $NaNi_{0.5}Mn_{0.5}O_2$ (FIG. 1(A), prior art), $NaNi_{0.45}Mn_{0.45}Mg_{0.05}Ti_{0.05}O_2$ (FIG. 1(B)), $NaNi_{0.40}Mn_{0.40}Mg_{0.10}Ti_{0.10}O_2$ (FIG. 1(C)), $NaNi_{0.35}Mn_{0.35}Mg_{0.15}Ti_{0.15}O_2$ (FIG. 1(D)) and $NaNi_{0.30}Mn_{0.30}Mg_{0.20}Ti_{0.20}O_2$ (FIG. 1 (E)).

The data shown in FIGS. 1(A), (B), (C), (D) and (E) are derived from the constant current cycling data for the $NaNi_{0.5-x}Mn_{0.5-x}Mg_xTi_xO_2$ active materials in a Na-ion cell where these cathode materials were coupled with a Hard Carbon (Carbotron P/J) anode material. The electrolyte used is a 0.5 M solution of $NaClO_4$ in propylene carbonate. The constant current data were collected at an approximate current density of 0.10 mA/cm$^2$ between voltage limits of 1.50 and 4.00 V. To ensure that the Na-ion cells were fully charged, they were potentiostatically held at 4.0 V at the end of the constant current charging process until the current density dropped to 20% of the constant current value. The testing was carried out at room temperature. During the cell charging process, sodium ions are extracted from the cathode active materials, and inserted into the Hard Carbon anode. During the subsequent discharge process, sodium ions are extracted from the Hard Carbon and re-inserted into the cathode active materials.

The third cycle discharge processes for these cells correspond to the following cathode specific capacities: (A) $NaNi_{0.5}Mn_{0.5}O_2$=88 mAh/g; (B) $NaNi_{0.45}Mn_{0.45}Mg_{0.05}Ti_{0.05}O_2$=77 mAh/g; (C) $NaNi_{0.40}Mn_{0.40}Mg_{0.10}Ti_{0.10}O_2$=86 mAh/g; (D) $NaNi_{0.35}Mn_{0.35}Mg_{0.15}Ti_{0.15}O_2$=116 mAh/g; and (E) $NaNi_{0.30}Mn_{0.30}Mg_{0.20}Ti_{0.20}O_2$=109 mAh/g.

It should be noted from FIGS. 1(A), (B), (C), (D) and (E) that as the levels of Mg and Ti increase, there is a smoothing of the discharge voltage profile. This is an important observation as it is not advantageous for application purposes to have voltage 'steps' in the discharge voltage profile, thus the materials according to the present invention, $NaNi_{0.45}Mn_{0.45}Mg_{0.05}Ti_{0.05}O_2$, $NaNi_{0.40}Mn_{0.40}Mg_{0.10}Ti_{0.10}O_2$, $NaNi_{0.35}Mn_{0.35}Mg_{0.15}Ti_{0.15}O_2$, and $NaNi_{0.30}Mn_{0.30}Mg_{0.20}Ti_{0.20}O_2$, provide significant advantage over prior art material $NaNi_{0.5}Mn_{0.5}O_2$.

Referring to FIGS. 2(A)-(E).

FIGS. 2(A)-(E) show the third cycle differential capacity profiles (Differential Capacity [mAh/g/V] Na-ion Cell Voltage [V]) for several Hard Carbon//$NaNi_{0.5-x}Mn_{0.5-x}Mg_xTi_xO_2$ cells. The cathode materials used to make these cells were: $NaNi_{0.5}Mn_{0.5}O_2$ (FIG. 2A, prior art), $NaNi_{0.45}Mn_{0.45}Mg_{0.05}Ti_{0.05}O_2$ (FIG. 2(B)), $NaNi_{0.40}Mn_{0.40}Mg_{0.10}Ti_{0.10}O_2$ (FIG. 2(C)), $NaNi_{0.35}Mn_{0.35}Mg_{0.15}Ti_{0.15}O_2$ (FIG. 2(D)) and $NaNi_{0.30}Mn_{0.30}Mg_{0.20}Ti_{0.20}O_2$ (FIG. 2(E)).

The data shown in FIGS. 2(A)-(E) are derived from the constant current cycling data for the $NaNi_{0.5-x}Mn_{0.5-x}Mg_xTi_xO_2$ active materials in a Na-ion cell where these cathode materials were coupled with a Hard Carbon (Carbotron P/J) anode material. The electrolyte used is a 0.5 M solution of $NaClO_4$ in propylene carbonate. The constant current data were collected at an approximate current density of 0.10 mA/cm$^2$ between voltage limits of 1.50 and 4.00 V. To ensure that the Na-ion cells were fully charged, they were potentiostatically held at 4.0 V at the end of the constant current charging process until the current density dropped to 20% of the constant current value. The testing was carried out at room temperature. During the cell charging process, sodium ions are extracted from the cathode active materials, and inserted into the Hard Carbon anode. During the subsequent discharge process, sodium ions are extracted from the Hard Carbon and re-inserted into the cathode active materials. The data shown in FIGS. 2(A)-(E) characterize the charge-discharge behaviour of the Na-ion cells under test. Differential capacity data have been demonstrated to allow characterization of the reaction reversibility, order-disorder phenomenon and structural phase changes within the ion insertion system.

The differential capacity data for the $NaNi_{0.5}Mn_{0.5}O_2$ cathode (FIG. 2A) shows a very structured charge-discharge behaviour characterized by several sharp differential capacity peaks in both the charge and discharge processes. Peaks in the differential capacity data correspond to plateaux (voltage steps) in the voltage versus capacity profiles. It should be noted from FIGS. 2(B)-(E) that as the levels of Mg and Ti increase, there is a dramatic change in the differential capacity profiles (see for example the difference between the data derived from the Na-ion cell incorporating the $NaNi_{0.5}Mn_{0.5}O_2$ cathode material (FIG. 2A) and that for the Na-ion cell incorporating the $NaNi_{0.45}Mn_{0.45}Mg_{0.05}Ti_{0.05}O_2$ cathode material (FIG. 2B)). This is an important observation as it is not advantageous for application purposes to have voltage 'steps' in the discharge voltage profile. Increasing levels of Mg and Ti in the cathode materials (FIG. 2(C) to FIG. 2(E)) cause a further loss of structure in the differential capacity data and reflect directly the smoothing of the voltage profile due to the Mg and Ti incorporation into the structure of the cathode material. These observations demonstrate that the materials according to the present invention, i.e. $NaNi_{0.45}Mn_{0.45}Mg_{0.05}Ti_{0.05}O_2$ (FIG. 2(B)), $NaNi_{0.40}Mn_{0.40}Mg_{0.10}Ti_{0.10}O_2$ (FIG. 2(C)), $NaNi_{0.35}Mn_{0.35}Mg_{0.15}Ti_{0.15}O_2$ (FIG. 2(D)) and $NaNi_{0.30}Mn_{0.30}Mg_{0.20}Ti_{0.20}O_2$ (FIG. 2(E)), provide further significant advantageous over prior art material $NaNi_{0.5}Mn_{0.5}O_2$ (FIG. 2(A)).

Referring to FIGS. 3(A)-(E).

FIGS. 3(A)-(E) show the first four charge-discharge cycles (Na-ion Cell Voltage [V] versus Cumulative Cathode Specific Capacity [mAh/g]) for several Hard Carbon//$NaNi_{0.5-x}Mn_{0.5-x}Mg_xTi_xO_2$ cells. The cathode materials used to make these cells were: $NaNi_{0.5}Mn_{0.5}O_2$ (FIG. 3(A), prior art), $NaNi_{0.45}Mn_{0.45}Mg_{0.05}Ti_{0.05}O_2$ (FIG. 3(B)), $NaNi_{0.40}Mn_{0.40}Mg_{0.10}Ti_{0.10}O_2$ (FIG. 3(C)), $NaNi_{0.35}Mn_{0.35}Mg_{0.15}Ti_{0.15}O_2$ (FIG. 3(D) and $NaNi_{0.30}Mn_{0.30}Mg_{0.20}Ti_{0.20}O_2$ (FIG. 3(E)).

The data shown in FIGS. 3(A)-(E) are derived from the constant current cycling data for the $NaNi_{0.5-x}Mn_{0.5-x}Mg_xTi_xO_2$ active materials in a Na-ion cell where these cathode materials were coupled with a Hard Carbon (Carbotron P/J)

anode material. The electrolyte used is a 0.5 M solution of NaClO$_4$ in propylene carbonate. The constant current data were collected at an approximate current density of 0.10 mA/cm$^2$ between voltage limits of 1.50 and 4.00 V. To ensure that the Na-ion cells were fully charged, they were potentiostatically held at 4.0 V at the end of the constant current charging process until the current density dropped to 20% of the constant current value. The testing was carried out at room temperature. During the cell charging process, sodium ions are extracted from the cathode active materials, and inserted into the Hard Carbon anode. During the subsequent discharge process, sodium ions are extracted from the Hard Carbon and re-inserted into the cathode active materials.

The data in FIGS. 3(A)-(E) indicate the reversibility of the sodium ion extraction-insertion reactions. It is clear from inspection that the voltage profiles for the cathode iterations incorporating Mg and Ti (i.e. FIGS. 3(B)-(E)) show a less-structured profile. In addition, the level of voltage hysteresis (i.e. the voltage difference between the charge and discharge processes) is extremely small, indicating the excellent kinetics of the extraction-insertion reactions. This is an important property that is useful for producing a high rate active material, thus materials NaNi$_{0.45}$Mn$_{0.45}$Mg$_{0.05}$Ti$_{0.05}$O$_2$ (FIG. 3(B)), NaNi$_{0.40}$Mn$_{0.40}$Mg$_{0.10}$Ti$_{0.10}$O$_2$ (FIG. 3(C)), NaNi$_{0.35}$Mn$_{0.35}$Mg$_{0.15}$Ti$_{0.15}$O$_2$ (FIG. 3(D) and NaNi$_{0.30}$Mn$_{0.30}$Mg$_{0.20}$Ti$_{0.20}$O$_2$ (FIG. 3(E)) exhibit still further advantages over prior art material NaNi$_{0.5}$Mn$_{0.5}$O$_2$ (FIG. 3(A).

Figure 4:
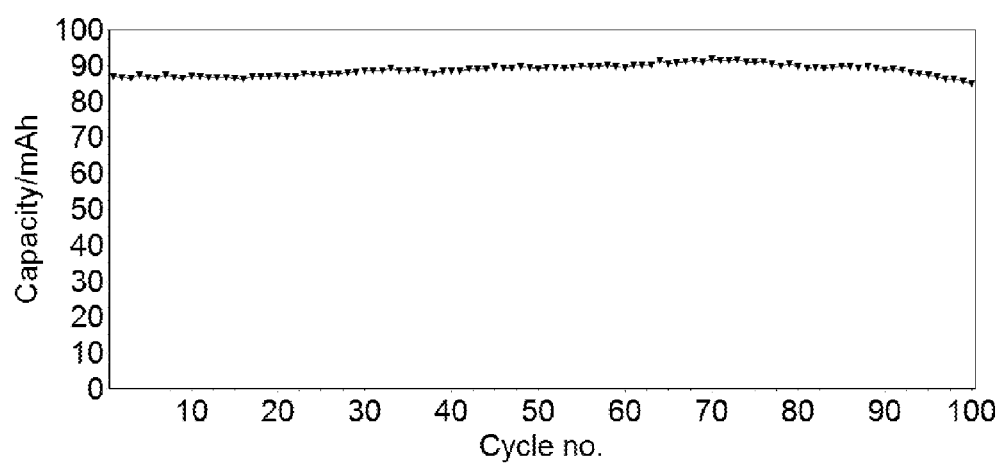
FIG. 4 shows Cycle Life (Cathode Specific Capacity [mAh/g] versus Cycle Number) for a Hard Carbon// $NaNi_{0.45}Mg_{0.45}Mg_{0.05}Ti_{0.05}O_2$ Cell.

Referring to FIG. 4.

FIG. 4 shows the constant current cycling data for the NaNi$_{0.45}$Mn$_{0.45}$Mg$_{0.05}$Ti$_{0.05}$O$_2$ active material (prepared according to Example 2) in a Na-ion cell where it is coupled with a Hard Carbon (Carbotron P/J) anode material. The electrolyte used is a 0.5 M solution of NaClO$_4$ in propylene carbonate. The constant current data were collected at an approximate current density of 0.10 mA/cm$^2$ between voltage limits of 1.50 and 4.00 V. To ensure that the Na-ion cell was fully charged, the cell was potentiostatically held at 4.00 V at the end of the constant current charging process until the current density dropped to 20% of the constant current value. The testing was carried out at room temperature. It is evident that sodium ions are extracted from the cathode active material, NaNi$_{0.45}$Mn$_{0.45}$Mg$_{0.05}$Ti$_{0.05}$O$_2$, and inserted into the Hard Carbon anode during the initial charging of the cell. During the subsequent discharge process, sodium ions are extracted from the Hard Carbon and re-inserted into the NaNi$_{0.45}$Mn$_{0.45}$Mg$_{0.05}$Ti$_{0.05}$O$_2$ cathode active material. The first discharge process corresponds to a specific capacity for the cathode of about 87 mAh/g, indicating the reversibility of the sodium ion extraction-insertion processes.

Na-ion cells reported in the literature commonly show relatively rapid capacity fade on cycling. It is common for these cells to fade in capacity by more than 50% in the first 30 cycles. The data shown in FIG. 4, show that the Hard Carbon//NaNi$_{0.45}$Mn$_{0.45}$Mg$_{0.05}$Ti$_{0.05}$O$_2$ cell demonstrates quite exceptional cycling behaviour. There is almost no capacity fade over the first 100 cycles. The initial specific capacity for the cathode is about 87 mAh/g and after 100 cycles the specific capacity for the cathode is about 85 mAh/g, indicating a capacity fade of less than 3%.

Figure 5A:
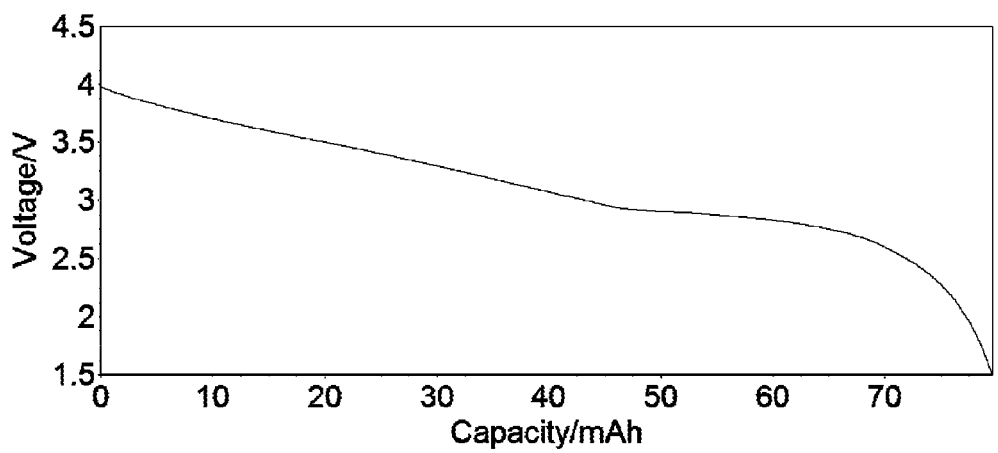
FIG. 5(A) shows Third Cycle Discharge Voltage Profiles (Na-ion Cell Voltage [V] versus Cathode Specific Capacity [mAh/g]) for prior art cathode material $NaNi_{0.5}Ti_{0.5}O_2$, made according to Example 6.
Figure 5B:
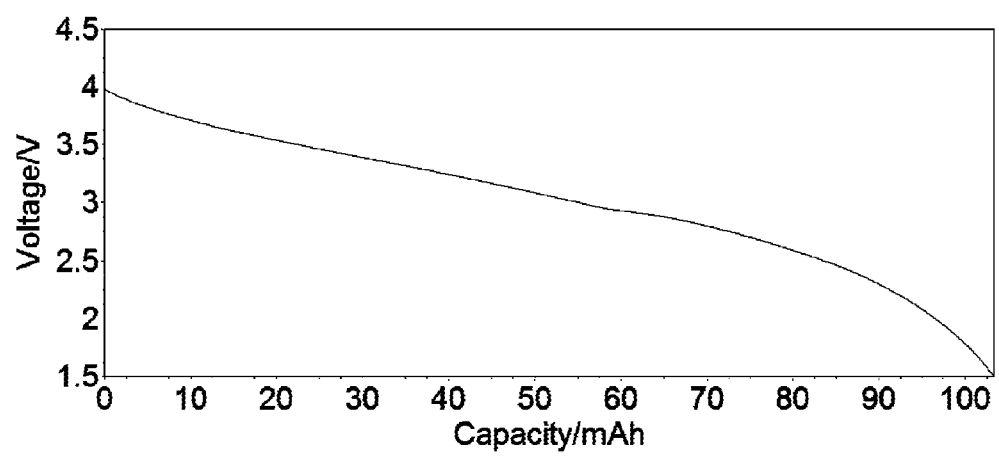
FIG. 5(B) shows Third Cycle Discharge Voltage Profiles (Na-ion Cell Voltage [V] versus Cathode Specific Capacity [mAh/g]) for cathode material, $NaNi_{0.40}Ti_{0.50}Mg_{0.10}O_2$, according to the present invention and made according to Example 7.
Figure 5C:
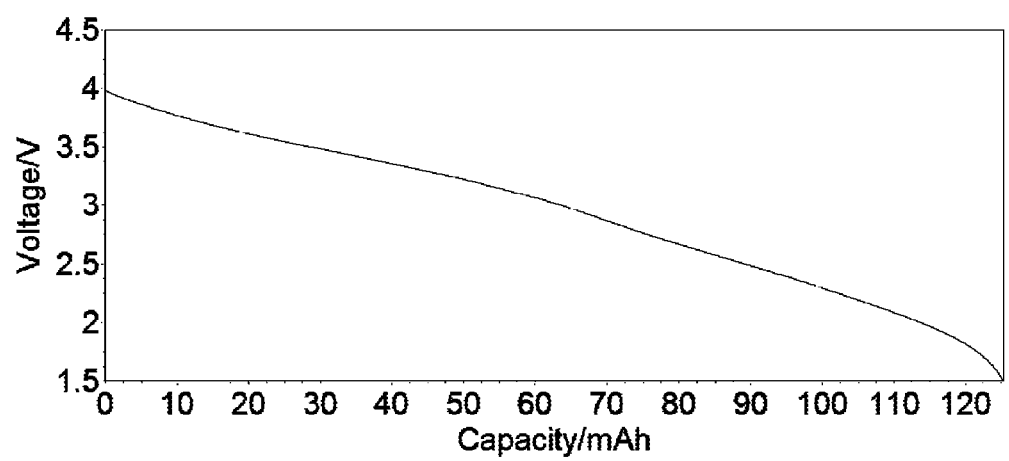
FIG. 5(C) shows Third Cycle Discharge Voltage Profiles (Na-ion Cell Voltage [V] versus Cathode Specific Capacity [mAh/g]) for prior art cathode material $NaNi_{0.40}Ti_{0.40}Mg_{0.10}Mn_{0.10}O_2$ according to the present invention and made according to Example 8.

Referring to FIGS. 5(A)-(C).

FIGS. 5(A)-(C) show the third cycle discharge voltage profiles (Na-ion Cell Voltage [V] versus Cathode Specific Capacity [mAh/g]) for several Hard Carbon//NaNi$_V$Mn$_W$Mg$_X$Ti$_Y$O$_2$ cells. The cathode materials used to make these cells were: NaNi$_{0.5}$Ti$_{0.5}$O$_2$ (FIG. 5A)), NaNi$_{0.40}$Ti$_{0.50}$Mg$_{0.10}$O$_2$ (FIG. 5(B)), and NaNi$_{0.40}$Ti$_{0.40}$Mg$_{0.00}$Mn$_{0.10}$O$_2$ (FIG. 5(C)).

The data shown in FIGS. 5(A)-(C) are derived from the constant current cycling data for the NaNi$_V$Mn$_W$Mg$_X$Ti$_Y$O$_2$ active materials in a Na-ion cell where these cathode materials were coupled with a Hard Carbon (Carbotron P/J) anode material. The electrolyte used is a 0.5 M solution of NaClO$_4$ in propylene carbonate. The constant current data were collected at an approximate current density of 0.10 mA/cm$^2$ between voltage limits of 1.50 and 4.00 V. To ensure that the Na-ion cells were fully charged, the cells were potentiostatically held at 4.0 V at the end of the constant current charging process until the current density dropped to 20% of the constant current value. The testing was carried out at room temperature. During the cell charging process, sodium ions are extracted from the cathode active materials, and inserted into the Hard Carbon anode. During the subsequent discharge process, sodium ions are extracted from the Hard Carbon and re-inserted into the cathode active materials. From inspection of FIGS. 5(A)-(C) we can detect that with the incorporation of Mg and Mn in the cathode active material there is a dramatic increase in the reversible cathode specific capacity. The third cycle discharge processes for these cells correspond to the following cathode specific capacities: NaNi$_{0.5}$Ti$_{0.5}$O$_2$=79 mAh/g (FIG. 5(A)); NaNi$_{0.40}$Ti$_{0.50}$Mg$_{0.10}$O$_2$=103 mAh/g (FIG. 5(B); and NaNi$_{0.40}$Ti$_{0.40}$Mg$_{0.10}$Mn$_{0.10}$O$_2$=125 mAh/g (FIG. 5(C).

Figure 6A:
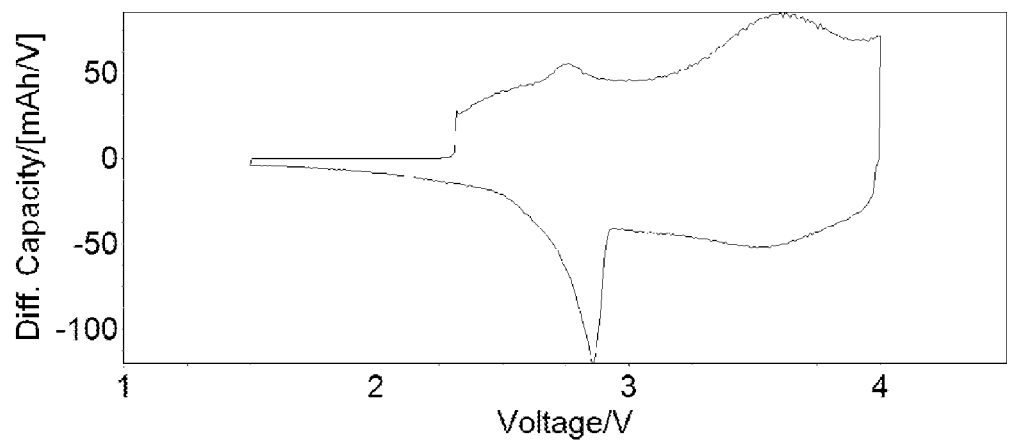
FIG. 6(A) shows Third Cycle Differential Capacity Profiles (Differential Capacity [mAh/g/V] Na-ion Cell Voltage [V]) for prior art cathode material $NaNi_{0.5}Ti_{0.5}O_2$, prepared according to Example 6.
Figure 6B:
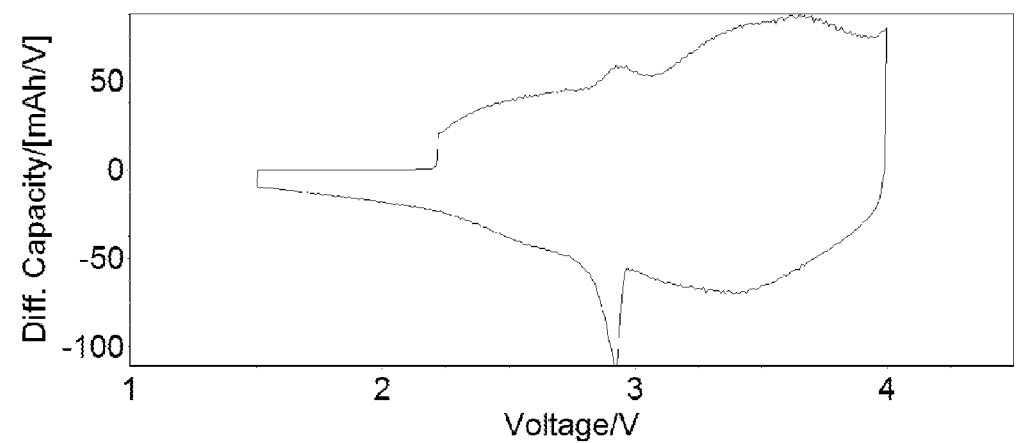
FIG. 6(B) shows Third Cycle Differential Capacity Profiles (Differential Capacity [mAh/g/V] versus Na-ion Cell Voltage [V]) for cathode material $NaNi_{0.40}Ti_{0.50}Mg_{0.10}O_2$, according to the present invention and prepared according to Example 7.
Figure 6C:
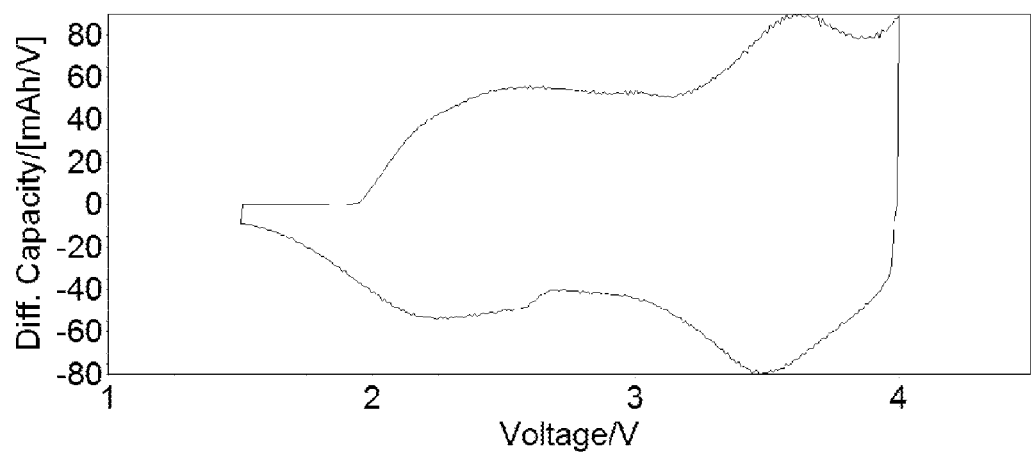
FIG. 6(C) shows Third Cycle Differential Capacity Profiles (Differential Capacity [mAh/g/V] versus Na-ion Cell Voltage [V]) for cathode material according $NaNi_{0.40}Ti_{0.40}Mg_{0.10}Mn_{0.10}O_2$, to the present invention and prepared according to Example 8.

Referring to FIGS. 6(A)-(C).

FIGS. 6(A)-(C) show the third cycle differential capacity profiles (Differential Capacity [mAh/g/V] Na-ion Cell Voltage [V]) for several Hard Carbon//NaNi$_V$Mn$_W$Mg$_X$Ti$_Y$O$_2$ cells. The cathode materials used to make these cells were: NaNi$_{0.5}$Ti$_{0.5}$O$_2$ (FIG. 6(A)), NaNi$_{0.40}$Ti$_{0.50}$Mg$_{0.10}$O$_2$ (FIG. 6(B)), and NaNi$_{0.40}$Ti$_{0.40}$Mg$_{0.10}$Mn$_{0.10}$O$_2$ (FIG. 6(C)).

The data shown in FIGS. 6(A)-(C) are derived from the constant current cycling data for the NaNi$_V$Mn$_W$Mg$_X$Ti$_Y$O$_2$ active materials in a Na-ion cell where these cathode materials were coupled with a Hard Carbon (Carbotron P/J) anode material. The electrolyte used is a 0.5 M solution of NaClO$_4$ in propylene carbonate. The constant current data were collected at an approximate current density of 0.10 mA/cm$^2$ between voltage limits of 1.50 and 4.00 V. To ensure that the Na-ion cells were fully charged, the cells were potentiostatically held at 4.0 V at the end of the constant current charging process until the current density dropped to 20% of the constant current value. The testing was carried out at room temperature. During the cell charging process, sodium ions are extracted from the cathode active materials, and inserted into the Hard Carbon anode. During the subsequent discharge process, sodium ions are extracted from the Hard Carbon and re-inserted into the cathode active materials. The data shown in FIGS. 6(A)-(C) characterize the charge-discharge behaviour of the Na-ion cells under test. Differential capacity data have been demonstrated to allow characterization of the reaction reversibility, order-disorder phenomenon and structural phase changes within the ion insertion system.

The differential capacity data for the NaNi$_{0.5}$Ti$_{0.5}$O$_2$ cathode (FIG. 6A) show a structured charge-discharge behaviour characterized by a sharp differential capacity peak at about 2.85 V on discharge. Peaks in the differential capacity data correspond to plateaux (voltage steps) in the voltage versus capacity profiles.

It should be noted from FIGS. 6(B)-(C) that on incorporation of Mg and Mn into the cathode material, there is a dramatic change in the differential capacity profiles (see for example the difference between the data derived from the Na-ion cell incorporating the $NaNi_{0.5}Ti_{0.5}O_2$ cathode material (FIG. 6(A)) and that for the Na-ion cell incorporating the $NaNi_{0.40}Ti_{0.40}Mg_{0.10}Mn_{0.10}O_2$ cathode material (FIG. 6(C)). This is an important observation because, as described above, it is not advantageous for application purposes to have voltage 'steps' in the discharge voltage profile.

Figure 7A:
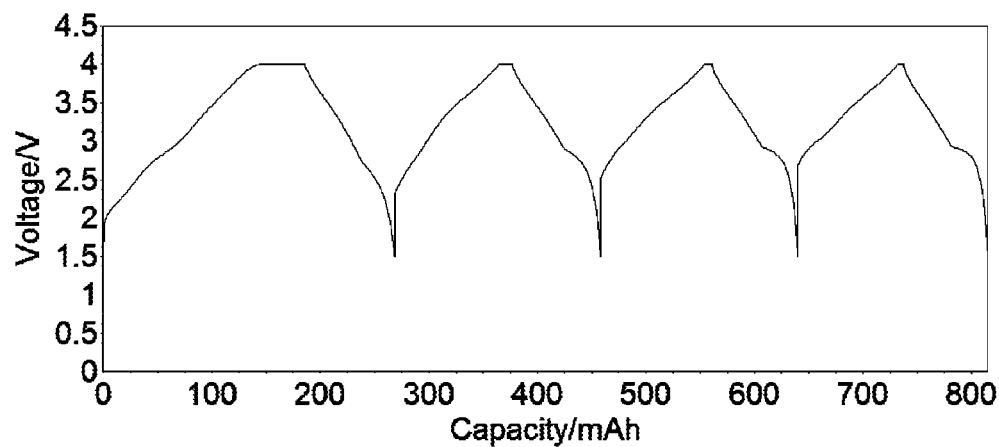
FIG. 7(A) shows Charge-Discharge Voltage Profiles for first 4 cycles (Na-ion Cell Voltage [V] versus Cumulative Cathode Specific Capacity [mAh/g]) for prior art cathode material $NaNi_{0.5}Ti_{0.5}O_2$, prepared according to Example 6.
Figure 7B:
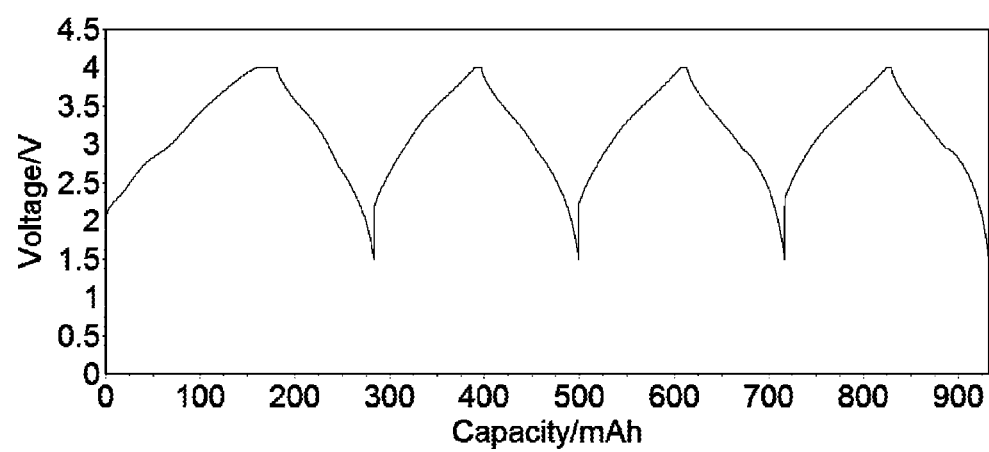
FIG. 7(B) shows Charge-Discharge Voltage Profiles for first 4 cycles (Na-ion Cell Voltage [V] versus Cumulative Cathode Specific Capacity [mAh/g]) for cathode material $NaNi_{0.40}Ti_{0.50}Mg_{0.10}O_2$, prepared according to Example 7.
Figure 7C:
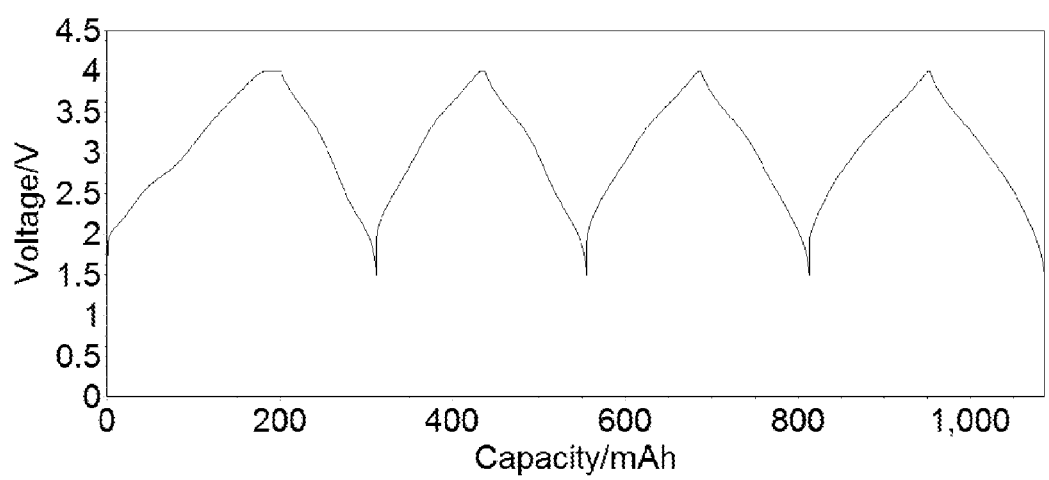
FIG. 7(C) shows Charge-Discharge Voltage Profiles for first 4 cycles (Na-ion Cell Voltage [V] versus Cumulative Cathode Specific Capacity [mAh/g]) for cathode material $NaNi_{0.40}Ti_{0.40}Mg_{0.10}Mn_{0.10}O_2$, prepared according to Example 8.

Referring to FIGS. 7(A)-(C).

FIGS. 7(A)-(C) show the first four charge-discharge cycles (Na-ion Cell Voltage [V] versus Cumulative Cathode Specific Capacity [mAh/g]) for several Hard Carbon//$NaNi_VMn_WMg_XTi_YO_2$ cells. The cathode materials used to make these cells were: $NaNi_{0.5}Ti_{0.5}O_2$ (FIG. 7(A)), $NaNi_{0.40}Ti_{0.50}Mg_{0.10}O_2$ (FIG. 7(B)), and $NaNi_{0.40}Ti_{0.40}Mg_{0.10}Mn_{0.10}O_2$ (FIG. 7(C)).

The data shown in FIGS. 7(A)-(C) are derived from the constant current cycling data for the $NaNi_VMn_WMg_XTi_YO_2$ active materials in a Na-ion cell where these cathode materials were coupled with a Hard Carbon (Carbotron P/J) anode material. The electrolyte used is a 0.5 M solution of $NaClO_4$ in propylene carbonate. The constant current data were collected at an approximate current density of 0.10 $mA/cm^2$ between voltage limits of 1.50 and 4.00 V. To ensure that the Na-ion cells were fully charged, the cells were potentiostatically held at 4.0 V at the end of the constant current charging process until the current density dropped to 20% of the constant current value. The testing was carried out at room temperature. During the cell charging process, sodium ions are extracted from the cathode active materials, and inserted into the Hard Carbon anode. During the subsequent discharge process, sodium ions are extracted from the Hard Carbon and re-inserted into the cathode active materials. The data in FIGS. 7(A)-(C) indicate the reversibility of the sodium ion extraction-insertion reactions. It is clear from inspection that the voltage profiles for the cathode iterations incorporating Mg and Mn (i.e. FIGS. 7(B) and 7(C)) show a less-structured profile. In addition, the level of voltage hysteresis (i.e. the voltage difference between the charge and discharge processes) is extremely small, indicating the excellent kinetics of the extraction-insertion reactions. This is an important property that is useful for producing a high rate active material. Thus the compounds of the present invention, $NaNi_{0.40}Ti_{0.50}Mg_{0.10}O_2$ (FIG. 7(B)), and $NaNi_{0.40}Ti_{0.40}Mg_{0.10}Mn_{0.10}O_2$ (FIG. 7(C)) demonstrate significant advantages over prior art material $NaNi_{0.5}Ti_{0.5}O_2$ (FIG. 7(A)).

Figure 8A:
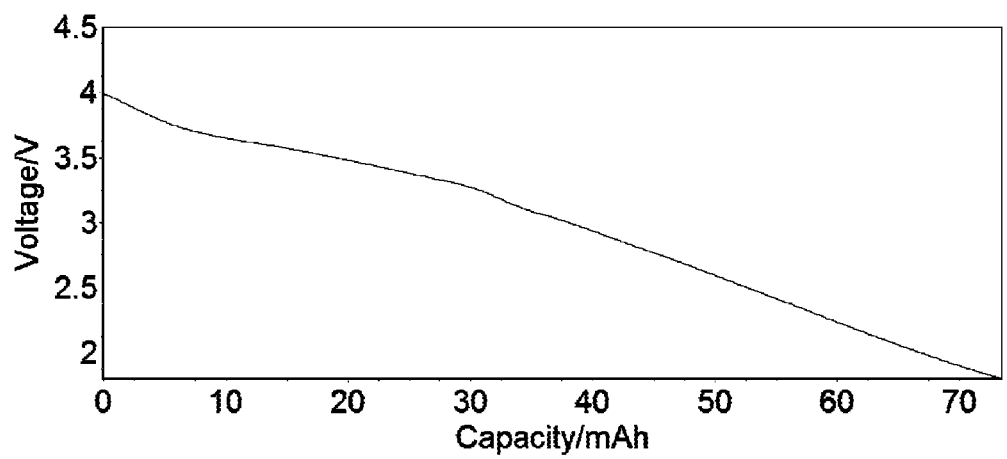
FIG. 8(A) shows Third Cycle Discharge Voltage Profile (Na-ion Cell Voltage [V] versus Cathode Specific Capacity [mAh/g]) for a Hard Carbon// $NaNi_{0.40}Mn_{0.4}Mg_{0.05}Ti_{0.05}Al_{0.1}O_2$ Cell.
Figure 8B:
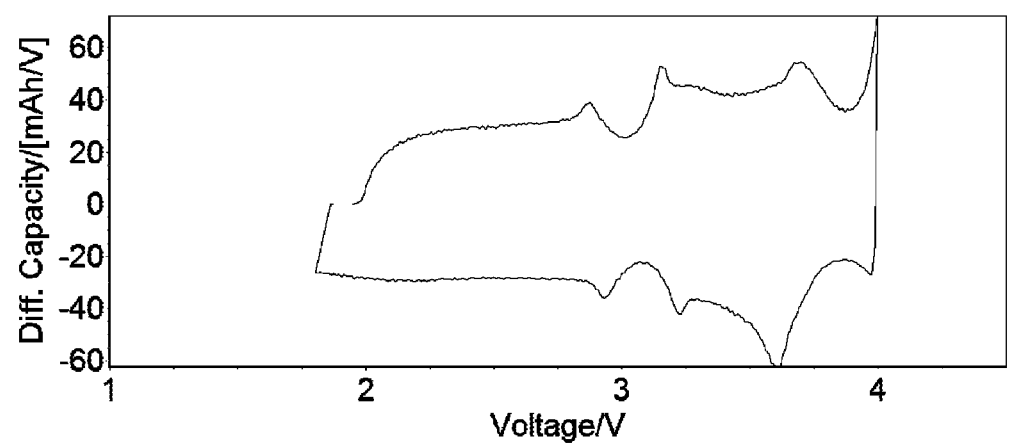
FIG. 8(B) shows Third Cycle Differential Capacity Profiles (Differential Capacity [mAh/g/V] Na-ion Cell Voltage [V]) for a Hard Carbon// $NaNi_{0.40}Mn_{0.4}Mg_{0.05}Ti_{0.05}Al_{0.1}O_2$ Cell.
Figure 8C:
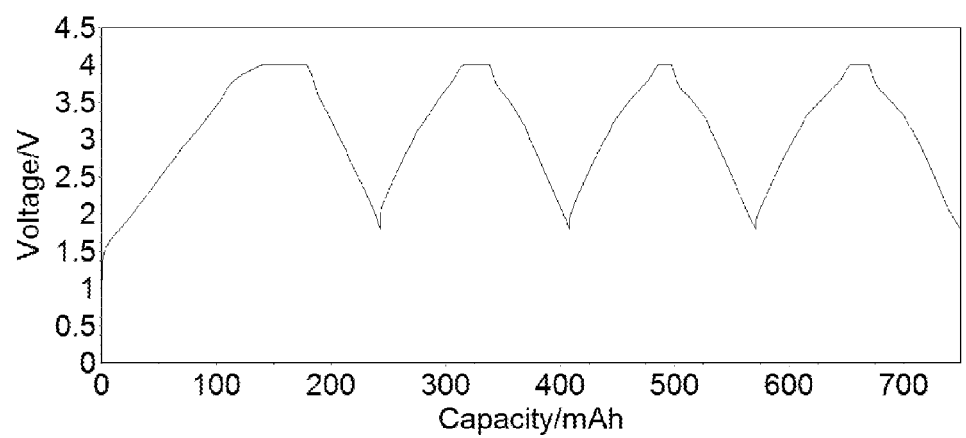
FIG. 8(C) shows Charge-Discharge Voltage Profiles for first 4 cycles (Na-ion Cell Voltage [V] versus Cumulative Cathode Specific Capacity [mAh/g]) for a Hard Carbon// $NaNi_{0.40}Mn_{0.40}Mn_{0.4}Mg_{0.05}Ti_{0.05}Al_{0.1}O_2$ Cell.

Referring to FIGS. 8(A)-(C).

The data shown in FIGS. 8(A)-(C) are derived from the constant current cycling data for a $NaNi_{0.40}Mn_{0.40}Mg_{0.05}Ti_{0.05}Al_{0.1}O_2$ active material in a Na-ion cell where this cathode material was coupled with a Hard Carbon (Carbotron P/J) anode material. The electrolyte used is a 0.5 M solution of $NaClO_4$ in propylene carbonate. The constant current data were collected at an approximate current density of 0.10 $mA/cm^2$ between voltage limits of 1.50 and 4.00 V. To fully charge the cell, the Na-ion cell was potentiostatically held at 4.0 V at the end of the constant current charging process until the current density dropped to 20% of the constant current value. The testing was carried out at room temperature. During the cell charging process, sodium ions are extracted from the cathode active material, and inserted into the Hard Carbon anode. During the subsequent discharge process, sodium ions are extracted from the Hard Carbon and re-inserted into the cathode active material.

FIG. 8(A) shows the third cycle discharge voltage profile (Na-ion Cell Voltage [V] versus Cathode Specific Capacity [mAh/g]) for the Hard Carbon//$NaNi_{0.40}Mn_{0.40}Mg_{0.05}Ti_{0.05}Al_{0.1}O_2$ cell. The cathode specific capacity corresponds to 73 mAh/g.

FIG. 8(B) shows the third cycle differential capacity profiles (Differential Capacity [mAh/g/V] Na-ion Cell Voltage [V]) for the Hard Carbon//$NaNi_{0.40}Mn_{0.40}Mg_{0.05}Ti_{0.05}Al_{0.1}O_2$ cell. These symmetrical data demonstrate the excellent reversibility of the ion extraction-insertion reactions in this Na-ion cell.

FIG. 8(C) shows the first four charge-discharge cycles (Na-ion Cell Voltage [V] versus Cumulative Cathode Specific Capacity [mAh/g]) for the Hard Carbon//$NaNi_{0.40}Mn_{0.40}Mg_{0.05}Ti_{0.05}Al_{0.1}O_2$ cell. These data demonstrate that the level of voltage hysteresis (i.e. the voltage difference between the charge and discharge processes) is extremely small, indicating the excellent kinetics of the extraction-insertion reactions.

Figure 9A:
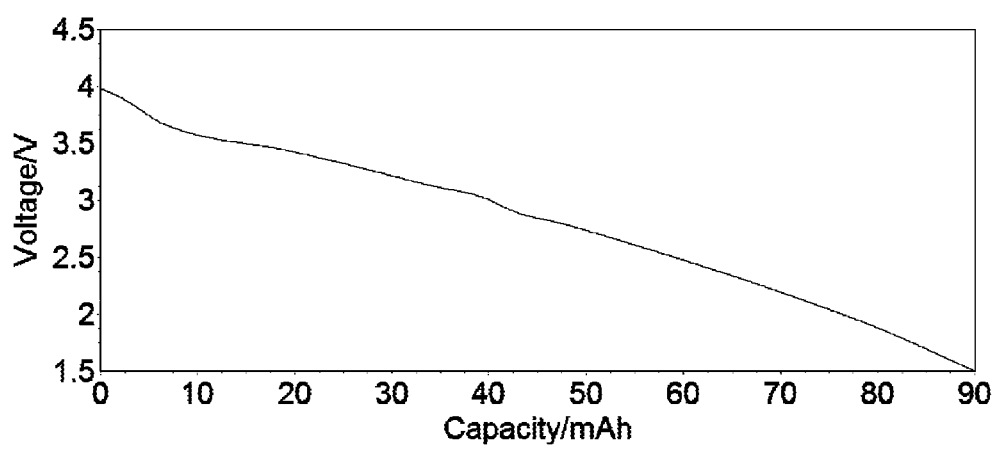
FIG. 9(A) shows Third Cycle Discharge Voltage Profile (Na-ion Cell Voltage [V] versus Cathode Specific Capacity [mAh/g]) for a Hard Carbon// $NaNi_{0.45}Mn_{0.45}Cu_{0.05}Ti_{0.05}O_2$ Cell.
Figure 9B:
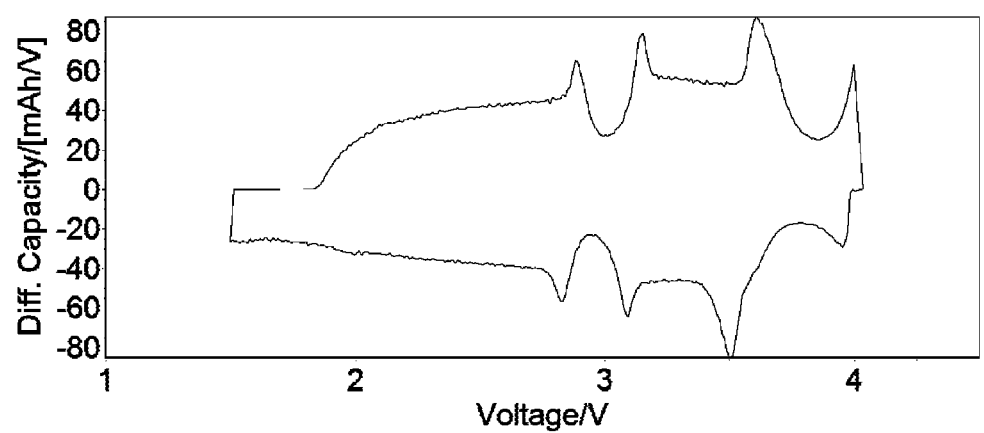
FIG. 9(B) shows Third Cycle Differential Capacity Profiles (Differential Capacity [mAh/gN] versus Na-ion Cell Voltage [V]) for a Hard Carbon// $NaNi_{0.45}Mn_{0.45}Cu_{0.05}Ti_{0.05}O_2$ Cell.
Figure 9C:
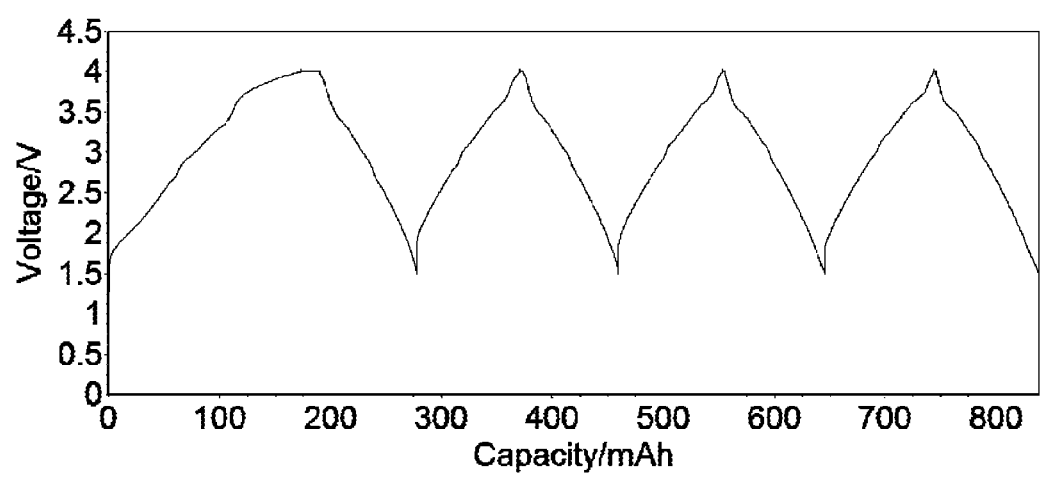
FIG. 9(C) shows Charge-Discharge Voltage Profiles for first 4 cycles (Na-ion Cell Voltage [V] versus Cumulative Cathode Specific Capacity [mAh/g]) for a Hard Carbon// $NaNi_{0.45}Mn_{0.45}Cu_{0.05}Ti_{0.0.5}O_2$ Cell.

Referring to FIGS. 9(A)-(C).

The data shown in FIGS. 9(A)-(C) are derived from the constant current cycling data for a $NaNi_{0.45}Mn_{0.45}Cu_{0.05}Ti_{0.05}O_2$ active material in a Na-ion cell where this cathode material was coupled with a Hard Carbon (Carbotron P/J) anode material. The electrolyte used is a 0.5 M solution of $NaClO_4$ in propylene carbonate. The constant current data were collected at an approximate current density of 0.10 $mA/cm^2$ between voltage limits of 1.50 and 4.00 V. To ensure that the Na-ion cell was fully charged, the cell was potentiostatically held at 4.0 V at the end of the constant current charging process until the current density dropped to 20% of the constant current value. The testing was carried out at room temperature. During the cell charging process, sodium ions are extracted from the cathode active material, and inserted into the Hard Carbon anode. During the subsequent discharge process, sodium ions are extracted from the Hard Carbon and re-inserted into the cathode active material.

FIG. 9(A) shows the third cycle discharge voltage profile (Na-ion Cell Voltage [V] versus Cathode Specific Capacity [mAh/g]) for the Hard Carbon//$NaNi_{0.45}Mn_{0.45}Cu_{0.05}Ti_{0.05}O_2$ cell. The cathode specific capacity corresponds to 90 mAh/g.

FIG. 9(B) shows the third cycle differential capacity profiles (Differential Capacity [mAh/g/V] Na-ion Cell Voltage [V]) for the Hard Carbon//$NaNi_{0.45}Mn_{0.45}Cu_{0.05}Ti_{0.05}O_2$ cell. These symmetrical data demonstrate the excellent reversibility of the ion extraction-insertion reactions in this Na-ion cell.

FIG. 9(C) shows the first four charge-discharge cycles (Na-ion Cell Voltage [V] versus Cumulative Cathode Specific Capacity [mAh/g]) for the Hard Carbon//$NaNi_{0.45}Mn_{0.45}Cu_{0.05}Ti_{0.05}O_2$ cell. These data demonstrate that the level of voltage hysteresis (i.e. the voltage difference between the charge and discharge processes) is extremely small, indicating the excellent kinetics of the extraction-insertion reactions.

Figure 10A:
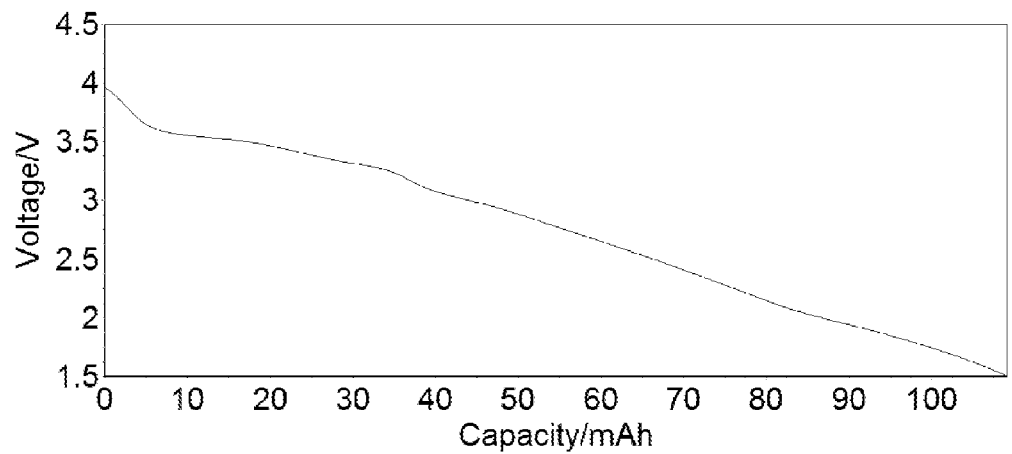
FIG. 10(A) shows Third Cycle Discharge Voltage Profile (Na-ion Cell Voltage [V] versus Cathode Specific Capacity [mAh/g]) for a Hard Carbon//NaNi$_{0.40}$Mn$_{0.40}$Ca$_{0.10}$Ti$_{0.10}$O$_2$ Cell.
Figure 10B:
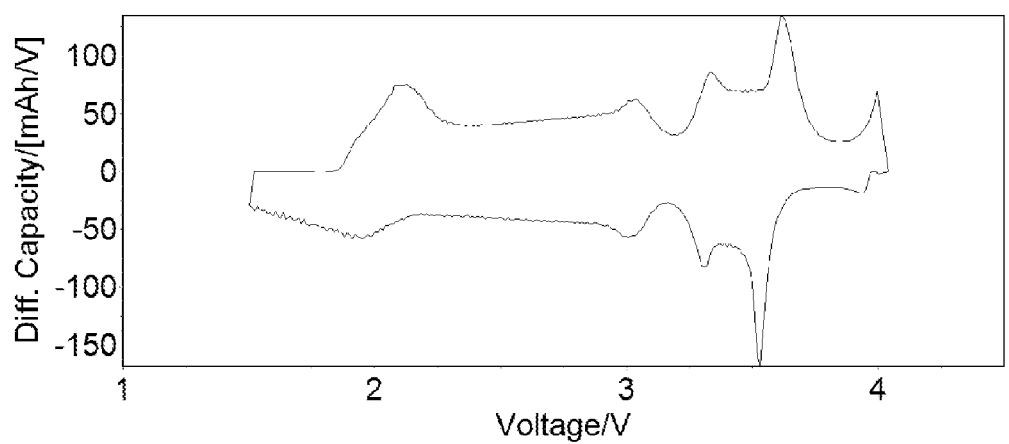
FIG. 10(B) shows Third Cycle Differential Capacity Profiles (Differential Capacity [mAh/g/V] versus Na-ion Cell Voltage [V]) for a Hard Carbon//NaNi$_{0.40}$Mn$_{0.40}$Ca$_{0.10}$Ti$_{0.10}$O$_2$ Cell.
Figure 10C:
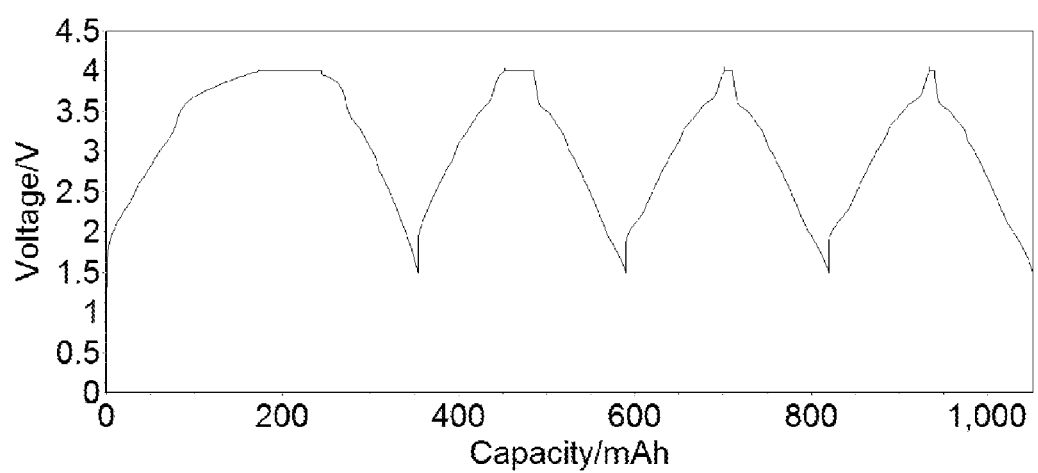
FIG. 10(C) shows Charge-Discharge Voltage Profiles for first 4 cycles (Na-ion Cell Voltage [V] versus Cumulative Cathode Specific Capacity [mAh/g]) for a Hard Carbon//NaNi$_{0.40}$Mn$_{0.40}$Ca$_{0.10}$Ti$_{0.10}$O$_2$ Cell.

Referring to FIGS. 10(A)-(C).

The data shown in FIGS. 10(A)-(C) are derived from the constant current cycling data for a $NaNi_{0.40}Mn_{0.40}Ca_{0.10}Ti_{0.10}O_2$ active material in a Na-ion cell where this cathode material was coupled with a Hard Carbon (Carbotron P/J) anode material. The electrolyte used is a 0.5 M solution of $NaClO_4$ in propylene carbonate. The constant current data were collected at an approximate current density of 0.10 $mA/cm^2$ between voltage limits of 1.50 and 4.00 V. To ensure that the Na-ion cell was fully charged, the cell was potentiostatically held at 4.0 V at the end of the constant current charging process until the current density dropped to 20% of the constant current value. The testing was carried out at room temperature. During the cell charging process, sodium ions are extracted from the cathode active material, and inserted into the Hard Carbon anode. During the subsequent discharge process, sodium ions are extracted from the Hard Carbon and re-inserted into the cathode active material.

FIG. 10(A) shows the third cycle discharge voltage profile (Na-ion Cell Voltage [V] versus Cathode Specific Capacity [mAh/g]) for the Hard Carbon//NaNi$_{0.40}$Mn$_{0.40}$Ca$_{0.10}$Ti$_{0.10}$O$_2$ cell. The cathode specific capacity corresponds to 109 mAh/g.

FIG. 10(B) shows the third cycle differential capacity profiles (Differential Capacity [mAh/g/V] Na-ion Cell Voltage [V]) for the Hard Carbon//NaNi$_{0.40}$Mn$_{0.40}$Ca$_{0.10}$Ti$_{0.10}$O$_2$ cell. These symmetrical data demonstrate the excellent reversibility of the ion extraction-insertion reactions in this Na-ion cell.

FIG. 10(C) shows the first four charge-discharge cycles (Na-ion Cell Voltage [V] versus Cumulative Cathode Specific Capacity [mAh/g]) for the Hard Carbon//NaNi$_{0.40}$Mn$_{0.40}$Ca$_{0.10}$Ti$_{0.10}$O$_2$ cell. These data demonstrate that the level of voltage hysteresis (i.e. the voltage difference between the charge and discharge processes) is extremely small, indicating the excellent kinetics of the extraction-insertion reactions.

Figure 11A:
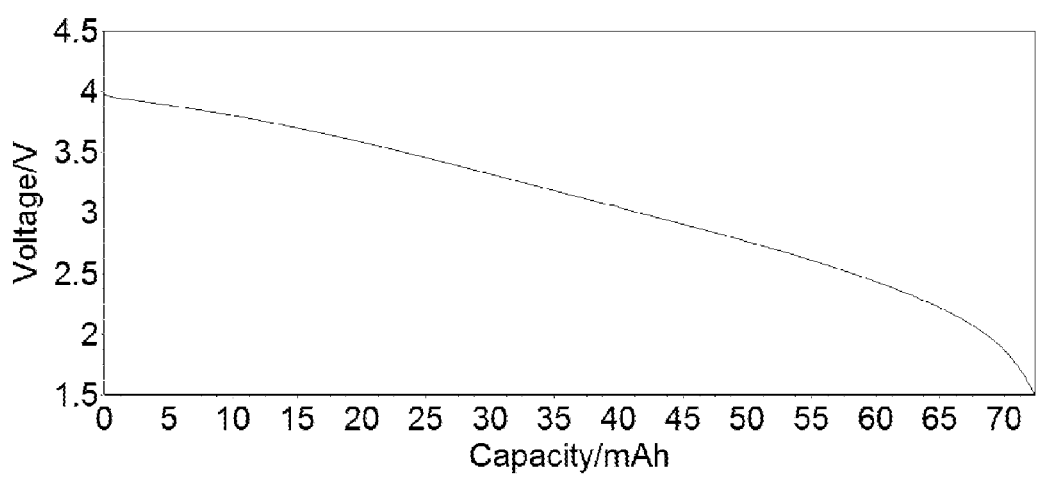
FIG. 11(A) shows Third Cycle Discharge Voltage Profile (Na-ion Cell Voltage [V] versus Cathode Specific Capacity [mAh/g]) for a Hard Carbon//NaNi$_{0.40}$Mn$_{0.40}$Zn$_{0.10}$Ti$_{0.10}$O$_2$ Cell.
Figure 11B:
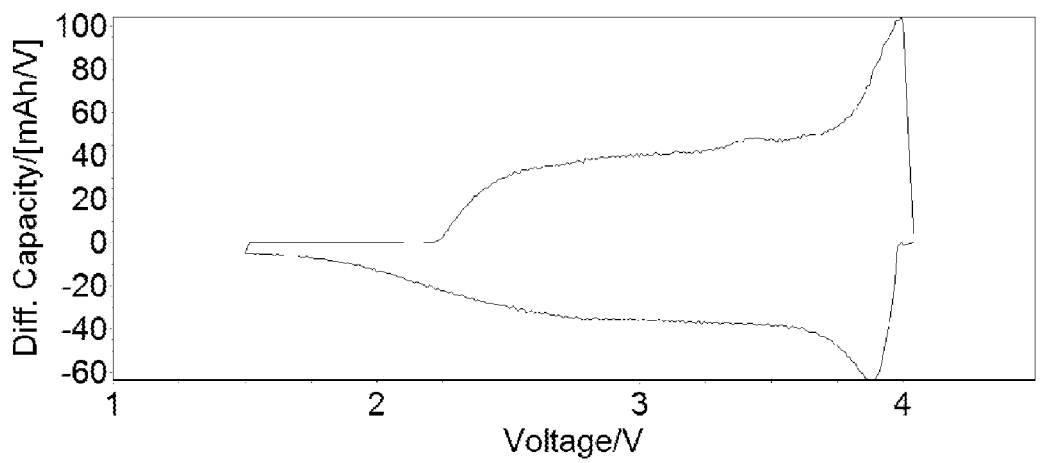
FIG. 11(B) shows Third Cycle Differential Capacity Profiles (Differential Capacity [mAh/g/V] versus Na-ion Cell Voltage [V]) for a Hard Carbon//NaNi$_{0.40}$Mn$_{0.40}$Zn$_{0.10}$Ti$_{0.10}$O$_2$ Cell.
Figure 11C:
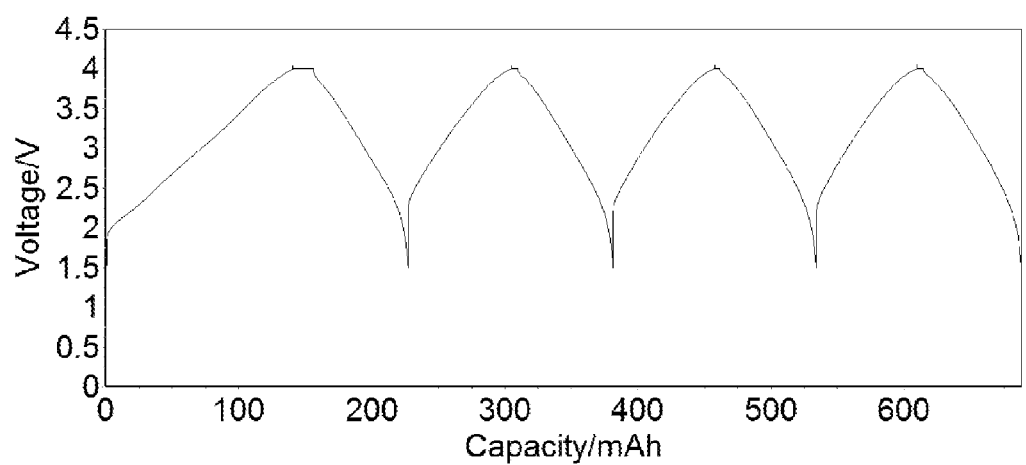
FIG. 11(C) shows Charge-Discharge Voltage Profiles for first 4 cycles (Na-ion Cell Voltage [V] versus Cumulative Cathode Specific Capacity [mAh/g]) for a Hard Carbon//NaNi$_{0.40}$Mn$_{0.40}$Zn$_{0.10}$Ti$_{0.10}$O$_2$ Cell.
Figure 12A:
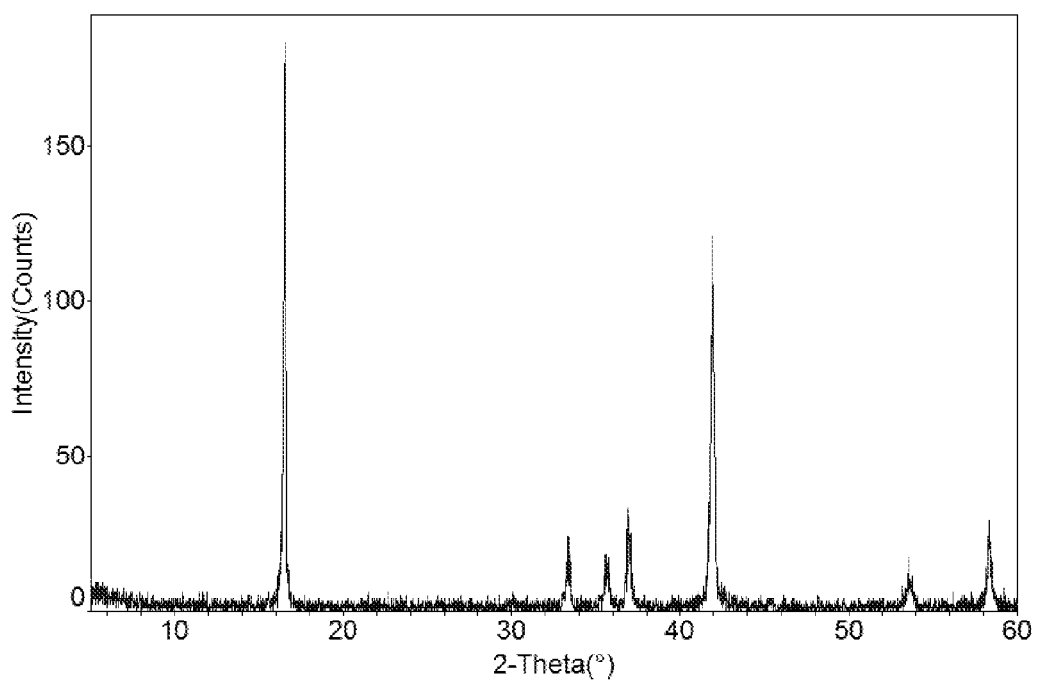
FIG. 12(A) is an XRD of NaNi$_{0.45}$Mn$_{0.45}$Mg$_{0.05}$Ti$_{0.05}$O$_2$ according to the present invention and prepared according to Example 2.
Figure 12B:
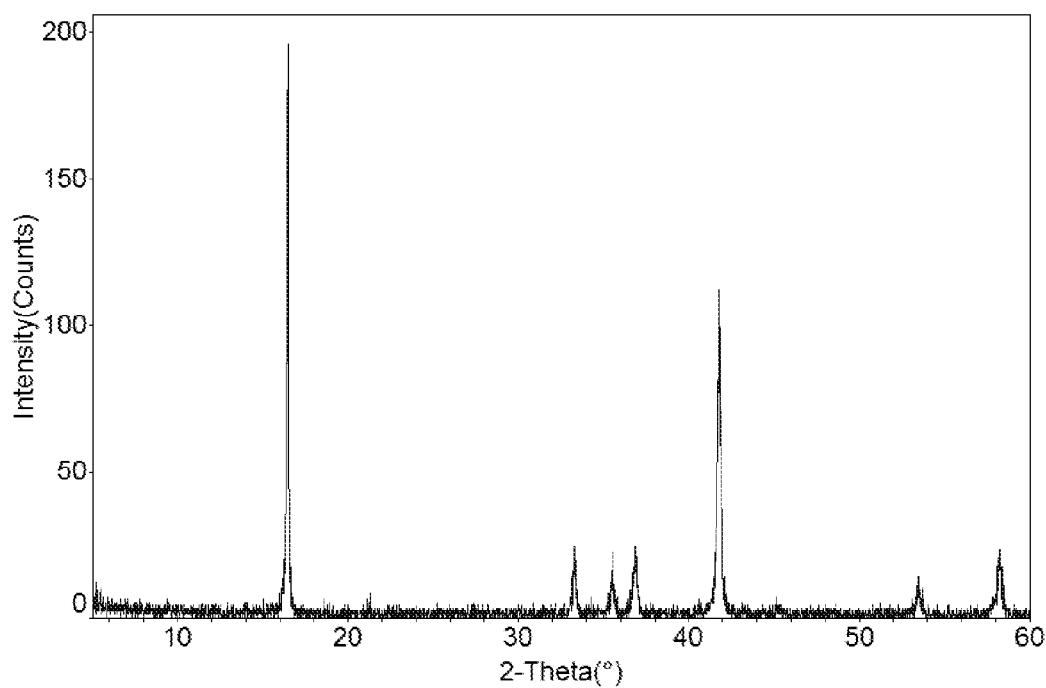
FIG. 12(B) is an XRD of NaNi$_{0.40}$Mn$_{0.40}$Mg$_{0.10}$Ti$_{0.10}$O$_2$ according to the present invention and prepared according to Example 3.
Figure 12C:
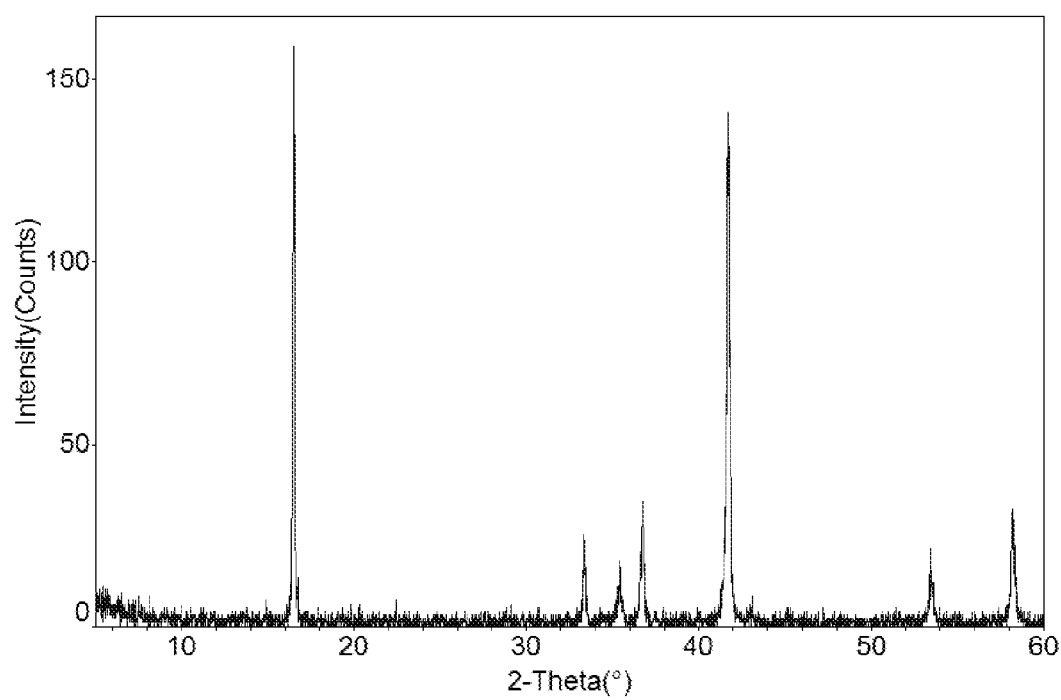
FIG. 12(C) is an XRD of NaNi$_{0.35}$Mn$_{0.35}$Mg$_{0.15}$Ti$_{0.15}$O$_2$ according to the present invention and prepared according to Example 4.
Figure 12D:
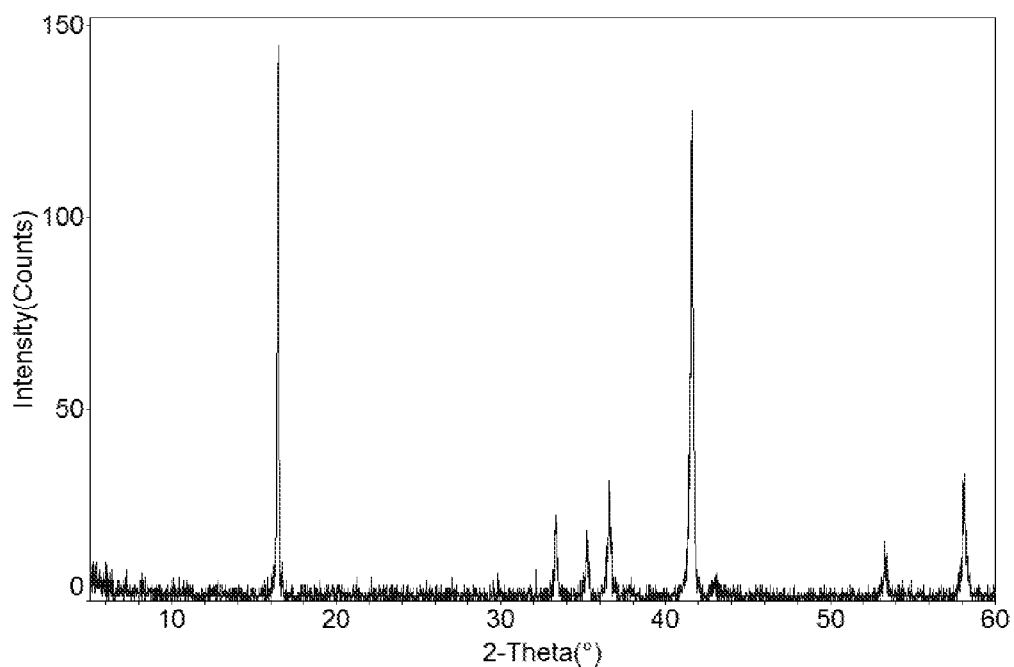
FIG. 12(D) is an XRD of NaNi$_{0.30}$Mn$_{0.30}$Mg$_{0.20}$Ti$_{0.20}$O$_2$ according to the present invention and prepared according to Example 5.
Figure 12E:
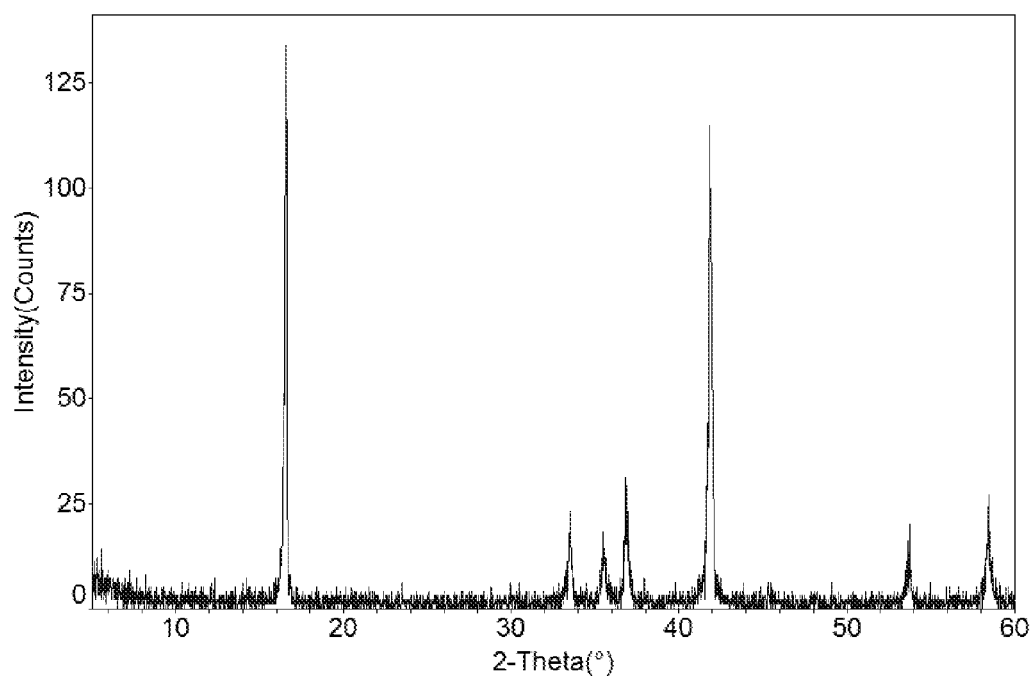
FIG. 12(E) is an XRD of NaNi$_{0.40}$Mn$_{0.4}$Mg$_{0.05}$Ti$_{0.05}$Al$_{0.1}$O$_2$ prepared according to Example 9.
Figure 12F:
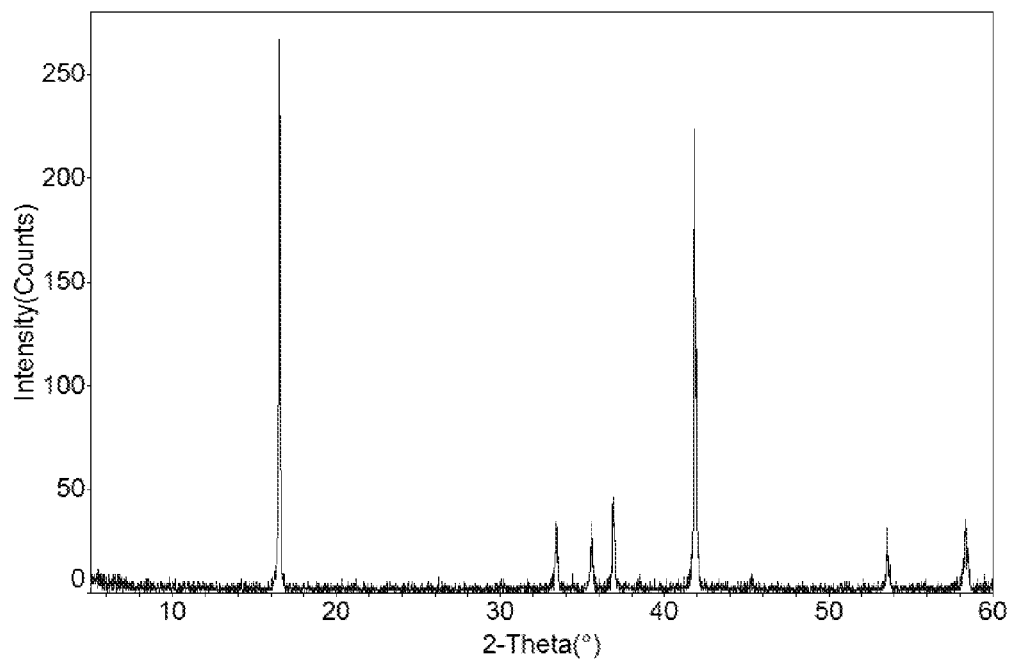
FIG. 12(F) is an XRD of NaNi$_{0.45}$Mn$_{0.45}$Cu$_{0.05}$Ti$_{0.05}$O$_2$, prepared according to Example 10.
Figure 12G:
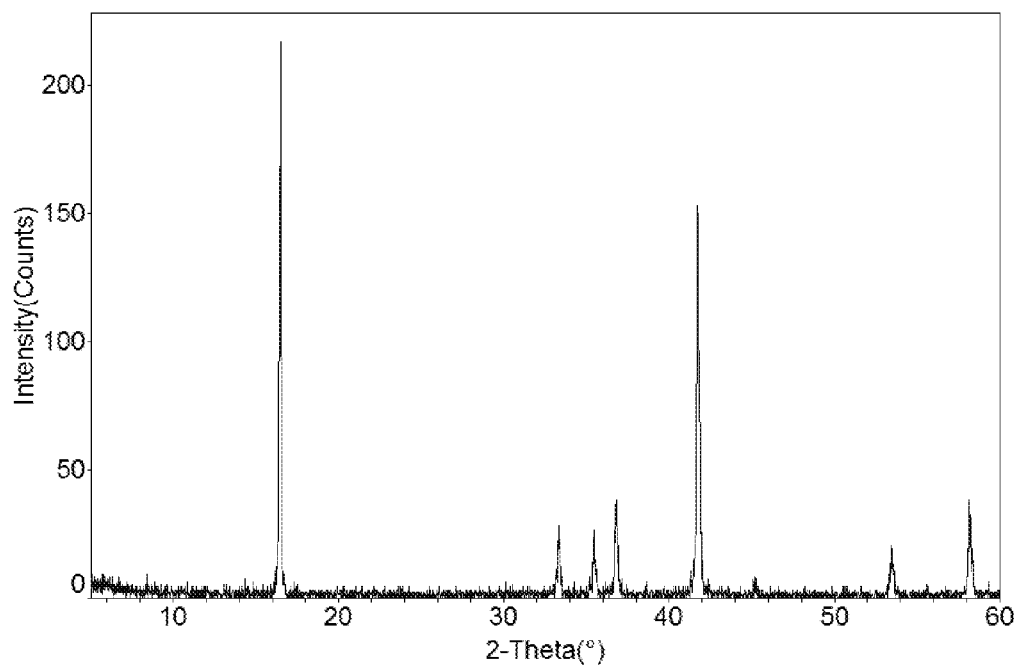
FIG. 12(G) is an XRD of NaNi$_{0.40}$Mn$_{0.40}$Zn$_{0.10}$Ti$_{0.10}$O$_2$, prepared according to Example 12.

Referring to FIGS. 11(A)-(C).

The data shown in FIGS. 11(A)-(C) are derived from the constant current cycling data for a NaNi$_{0.40}$Mn$_{0.40}$Zn$_{0.10}$Ti$_{0.10}$O$_2$ active material in a Na-ion cell where this cathode material was coupled with a Hard Carbon (Carbotron P/J) anode material. The electrolyte used is a 0.5 M solution of NaClO$_4$ in propylene carbonate. The constant current data were collected at an approximate current density of 0.10 mA/cm$^2$ between voltage limits of 1.50 and 4.00 V. To ensure that the Na-ion cell was fully charged, the cell was potentiostatically held at 4.0 V at the end of the constant current charging process until the current density dropped to 20% of the constant current value. The testing was carried out at room temperature. During the cell charging process, sodium ions are extracted from the cathode active material, and inserted into the Hard Carbon anode. During the subsequent discharge process, sodium ions are extracted from the Hard Carbon and re-inserted into the cathode active material.

FIG. 11(A) shows the third cycle discharge voltage profile (Na-ion Cell Voltage [V] versus Cathode Specific Capacity [mAh/g]) for the Hard Carbon//NaNi$_{0.40}$Mn$_{0.40}$Zn$_{0.10}$Ti$_{0.10}$O$_2$ cell. The cathode specific capacity corresponds to 72 mAh/g.

FIG. 11(B) shows the third cycle differential capacity profiles (Differential Capacity [mAh/g/V] Na-ion Cell Voltage [V]) for the Hard Carbon//NaNi$_{0.40}$Mn$_{0.40}$Zn$_{0.10}$Ti$_{0.10}$O$_2$ cell. These symmetrical data demonstrate the excellent reversibility of the ion extraction-insertion reactions in this Na-ion cell. In addition, the charge-discharge behaviour is now largely without structure.

FIG. 11(C) shows the first four charge-discharge cycles (Na-ion Cell Voltage [V] versus Cumulative Cathode Specific Capacity [mAh/g]) for the Hard Carbon//NaNi$_{0.40}$Mn$_{0.40}$Zn$_{0.10}$Ti$_{0.10}$O$_2$ cell. These data demonstrate that the level of voltage hysteresis (i.e. the voltage difference between the charge and discharge processes) is extremely small, indicating the excellent kinetics of the extraction-insertion reactions.

Figure 13A:
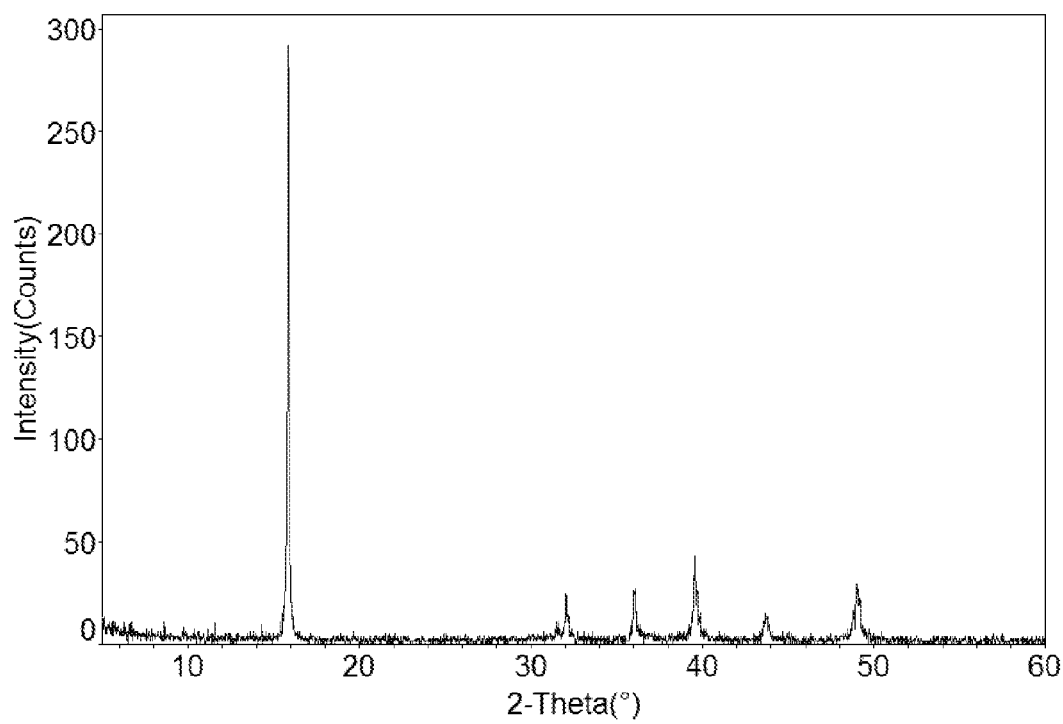
FIG. 13(A) is an XRD of Na$_{0.7}$MnO$_{2.05}$, prepared according to comparative Example 13.
Figure 13B:
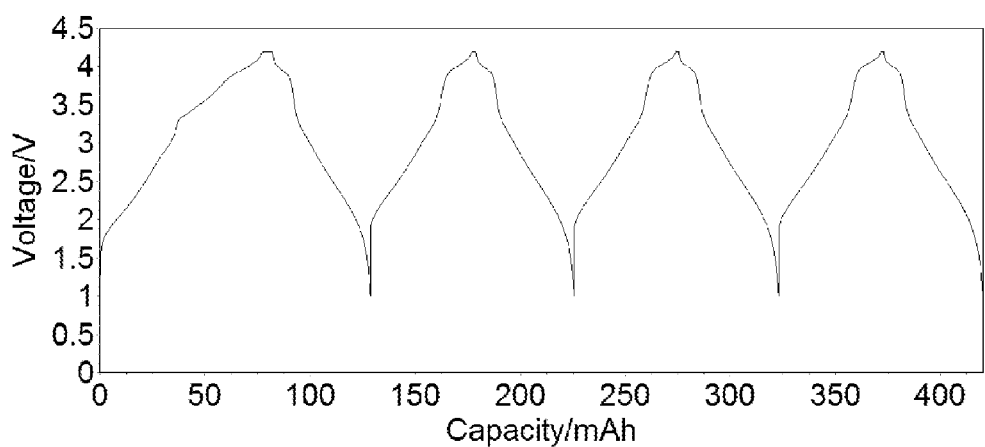
FIG. 13(B) shows the constant current cycling data (Na-ion Cell Voltage [V] versus Cumulative Cathode Specific Capacity [mAh/g]) for the first 4 cycles of the comparative material Na$_{0.7}$MnO$_{2.05}$ (X1386) active cathode material (P2 structure) in a Na-ion cell where it is coupled with a capacity balanced Hard Carbon (Carbotron P/J) anode material.

Referring to FIG. 13(B), this shows the constant current cycling data (Na-ion Cell Voltage [V] versus Cumulative Cathode Specific Capacity [mAh/g]) for the first 4 cycles of the Na$_{0.7}$MnO$_{2.05}$ (X1386) active cathode material (P2 structure) in a Na-ion cell where it is coupled with a capacity balanced Hard Carbon (Carbotron P/J) anode material.

The electrolyte used was a 0.5 M solution of NaClO$_4$ in propylene carbonate. The constant current data were collected at an approximate current density of 0.20 mA/cm$^2$ between voltage limits of 1.00 and 4.20 V. To ensure that the Na-ion cell was fully charged, the cell was potentiostatically held at 4.20 V at the end of the constant current charging process until the current density dropped to 20% of the constant current value. The testing was carried out at 25° C. It is evident that sodium ions are extracted from the cathode active material, Na$_{0.7}$MnO$_{2.05}$, and inserted into the Hard Carbon anode during the initial charging of the cell. During the subsequent discharge process, sodium ions are extracted from the Hard Carbon and re-inserted into the cathode active material.

The first charge process corresponds to a specific capacity for the cathode active material of only 81 mAh/g. The first discharge process corresponds to a specific capacity for the cathode of 47 mAh/g, indicating the poor reversibility of the sodium ion extraction-insertion processes. Clearly the specific capacity performance for the Na$_{0.7}$MnO$_{2.05}$ material (which has a P2 structure) is inferior to the performance from the O3 cathode materials.

Figure 14A:
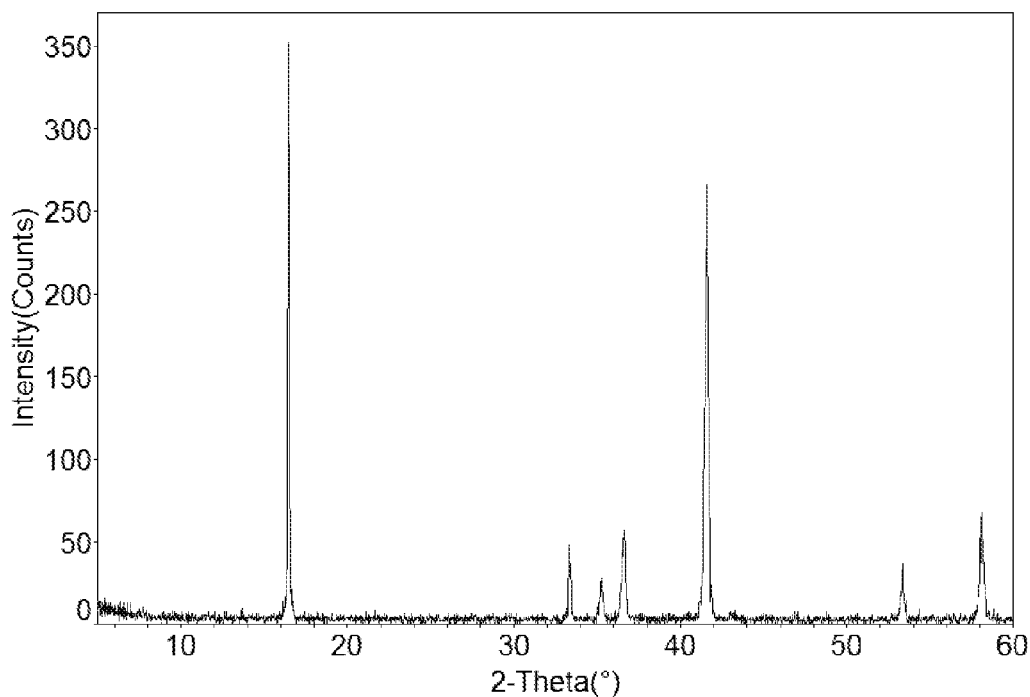
FIG. 14(A) is an XRD of Na$_{0.95}$Ni$_{0.3167}$Ti$_{0.3167}$Mg$_{0.1583}$Mn$_{0.2083}$O$_2$ prepared according to Example 14.
Figure 14B:
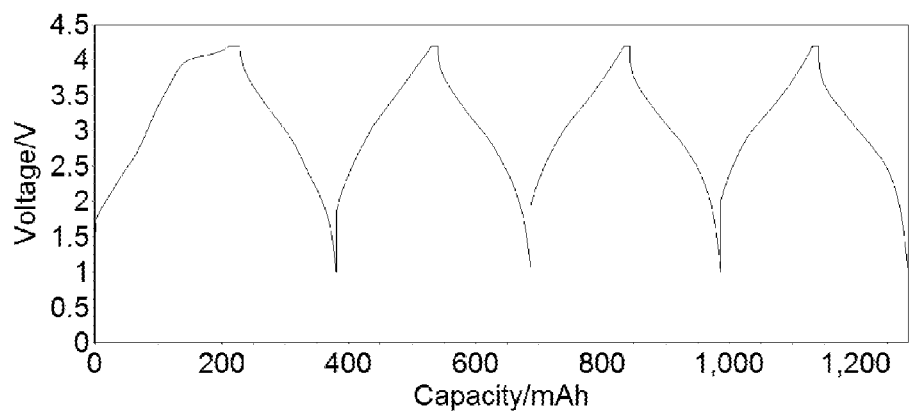
FIG. 14(B) shows the constant current cycling data (Na-ion Cell Voltage [V] versus Cumulative Cathode Specific Capacity [mAh/g]) for the first 4 cycles of the Na$_{0.95}$Ni$_{0.3167}$Mn$_{0.3167}$Mg$_{0.1583}$Ti$_{0.2083}$O$_2$ (X1380) active material in a Na-ion cell where it is coupled with a capacity balanced Hard Carbon (Carbotron P/J) anode material.

Referring to FIG. 14(B), this shows the constant current cycling data (Na-ion Cell Voltage [V] versus Cumulative Cathode Specific Capacity [mAh/g]) for the first 4 cycles of the Na$_{0.95}$Ni$_{0.3167}$Mn$_{0.3167}$Mg$_{0.1583}$Ti$_{0.2083}$O$_2$ (X1380) active material according to the present invention in a Na-ion cell where it is coupled with a capacity balanced Hard Carbon (Carbotron P/J) anode material.

The electrolyte used was a 0.5 M solution of NaClO$_4$ in propylene carbonate. The constant current data were collected at an approximate current density of 0.20 mA/cm$^2$ between voltage limits of 1.00 and 4.20 V. To ensure that the Na-ion cell was fully charged, the cell was potentiostatically held at 4.20 V at the end of the constant current charging process until the current density dropped to 20% of the constant current value. The testing was carried out at 25° C. It is evident that sodium ions are extracted from the cathode active material, Na$_{0.95}$Ni$_{0.3167}$Mn$_{0.3167}$Mg$_{0.1583}$Ti$_{0.2083}$O$_2$, and inserted into the Hard Carbon anode during the initial charging of the cell. During the subsequent discharge process, sodium ions are extracted from the Hard Carbon and re-inserted into the cathode active material.

The first charge process corresponds to a specific capacity for the cathode active material of 228 mAh/g. The first discharge process corresponds to a specific capacity for the cathode of 151 mAh/g, indicating the excellent active material utilization and the good reversibility of the sodium ion extraction-insertion processes.

The invention claimed is:
1. A compound of the formula:

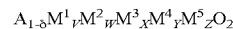

wherein
A is one or more alkali metals comprising sodium and/or potassium, either alone or in a mixture with lithium as a minor constituent;
M$^1$ is nickel in oxidation state +2
M$^2$ comprises a metal in oxidation state +4 selected from one or more of manganese, titanium and zirconium;

$M^3$ comprises a metal in oxidation state +2, selected from one or more of magnesium, calcium, copper, zinc and cobalt;

$M^4$ comprises a metal in oxidation state +4, selected from one or more of titanium, manganese and zirconium;

$M^5$ comprises a metal in oxidation state +3, selected from one or more of aluminum, iron, cobalt, molybdenum, chromium, vanadium, scandium and yttrium;

wherein $0 \le \delta \le 0.1$

V is in the range $0<V<0.5$;
W is in the range $0<W \le 0.5$;
X is in the range $0<X<0.5$;
Y is in the range $0 \le Y<0.5$;
Z is $\ge 0$;
and further wherein $V+W+X+Y+Z=1$.

2. A compound according to claim 1 wherein V is in the range $0.1 \le V \le 0.45$; W is in the range $0<W \le 0.5$; X is in the range $0 \le X<0.5$; Y is in the range $0 \le Y<0.5$; Z is $\ge 0$; and wherein $V+W+X+Y+Z=1$.

3. A compound according to claim 1 wherein V is in the range $0.3 \le V \le 0.45$; W is in the range $0.1 \le W \le 0.5$; X is in the range $0.05 \le X<0.45$; Y is in the range $0 \le Y \le 0.45$; Z is $\ge 0$; and wherein $V+W+X+Y+Z=1$.

4. A compound according to claim 1 wherein $M^2$ $M^4$.

5. A compound according to claim 1 of the formula:
$NaNi_{0.5-x}Mn_{0.5-x}Mg_xTi_xO_2$; $NaNi_{0.5-x}Mn_{0.5-x}Mg_{x/2}Ti_{x/2}Al_xO_2$; $NaNi_{0.5-x}Mn_{0.5-x}Ca_xTi_xO_2$; $NaNi_{0.5-x}Mn_{0.5-x}Co_xTi_xO_2$; $NaNi_{0.5-x}Mn_{0.5-x}Cu_xTi_xO_2$; $NaNi_{0.5-x}Mn_{0.5-x}Zn_xTi_xO_2$; $NaNi_{0.5-x}Mn_{0.5-x}Mg_xZr_xO_2$; $NaNi_{0.5-x}Mn_{0.25-x/2}Ca_xTi_{0.25+x/2}O_2$; $NaNi_{0.5-x}Mn_{0.5}Ca_xO_2$; $NaNi_{0.5-x}Mn_{0.5-Y}Ca_xTi_yO_2$; $NaNi_{0.5-x}Ti_{0.5-x}Mg_xMn_xO_2$; $NaNi_{0.5-x}Ti_{0.5-x}Ca_xMn_xO_2$; $NaNi_{0.5-x}Ti_{0.5-x}Cu_xMn_xO_2$; $NaNi_{0.5-x}Ti_{0.5-x}Co_xMn_xO_2$; $NaNi_{0.5-x}Ti_{0.5-x}Zn_xMn_xO_2$; $NaNi_{0.5-x}Mn_{0.5}Mg_xO_2$; $NaNi_{0.5-x}Mn_{0.5}Ca_xO_2$; $NaNi_{0.5-x}Mn_{0.5}Cu_xO_2$, $NaNi_{0.5-x}Mn_{0.5}Co_xO_2$; $NaNi_{0.5-x}Mn_{0.5}Zn_xO_2$; $NaNi_{0.5-x}Mn_{0.5-y}Mg_xTi_yO_2$; $NaNi_{0.5-x}Mn_{0.5-y}Ca_xTi_yO_2$; $NaNi_{0.5-x}Mn_{0.5-y}Cu_xTi_yO_2$; $NaNi_{0.5-x}Mn_{0.5-y}Co_xTi_yO_2$; $NaNi_{0.5-x}Mn_{0.5-y}Zn_xTi_yO_2$; $NaNi_{0.5-x}Mn_{0.25-x/2}Mg_xTi_{0.25+x/2}O_2$; $NaNi_{0.5-x}Mn_{0.25-x/2}Ca_xTi_{0.25+x/2}O_2$; $NaNi_{0.5-x}Mn_{0.25-x/2}Cu_xTi_{0.25+x/2}O_2$; $NaNi_{0.5-x}Mn_{0.25-x/2}Co_xTi_{0.25+x/2}O_2$; $NaNi_{0.5-x}Mn_{0.25-x/2}Zn_xTi_{0.25+x/2}O_2$; $NaNi_{0.5-x}Mn_{0.5-x}Mg_{x/2}Ti_{x/2}Al_xO_2$; $NaNi_{0.5-x}Mn_{0.5-x}Ca_{x/2}Ti_{x/2}Al_xO_2$; $NaNi_{0.5-x}Mn_{0.5-x}Cu_{x/2}Ti_{x/2}Al_xO_2$; $NaNi_{0.5-x}Mn_{0.5-x}Co_{x/2}Ti_{x/2}Al_xO_2$; $NaNi_{0.5-x}Mn_{0.5-x}Zn_{x/2}Ti_{x/2}Al_xO_2$ and $Na_{0.95}N_{0.3167}Ti_{0.3167}Mg_{0.1583}Mn_{0.2083}O_2$.

6. An electrode comprising an active compound according to claim 1.

7. An electrode according to claim 6 used in conjunction with a counter electrode and one or more electrolyte materials.

8. An electrode according to claim 7 wherein the electrolyte material comprises an aqueous electrolyte material.

9. An electrode according to claim 7 wherein the electrolyte material comprises a non-aqueous electrolyte.

10. An energy storage device comprising an electrode according to claim 6.

11. An energy storage device according to claim 10 suitable for use as one or more of the following: a sodium and/or potassium ion cell; a sodium and/or potassium metal cell; a non-aqueous electrolyte sodium and/or potassium ion cell; and an aqueous electrolyte sodium and/or potassium ion cell.

12. A rechargeable battery comprising an electrode according to claim 6.

13. An electrochemical device comprising an electrode according to claim 6.

14. An electrochromic device comprising an electrode according to claim 6.

15. A method of preparing the compounds according to claim 1 comprising the steps of:
a) mixing starting materials together,
b) heating the mixed starting materials in a furnace at a temperature of between 400° C. and 1500° C., for between 2 and 20 hours to give a reaction product; and
c) allowing the reaction product to cool.

* * * * *